United States Patent
Park

(10) Patent No.: US 10,704,921 B2
(45) Date of Patent: Jul. 7, 2020

(54) AUTONOMOUS VEHICLE AND AUTONOMOUS VEHICLE SYSTEM HAVING SAME

(71) Applicant: LG Electronics Inc., Seoul (KR)

(72) Inventor: Hyungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 15/746,178

(22) PCT Filed: Jul. 20, 2016

(86) PCT No.: PCT/KR2016/007883
§ 371 (c)(1),
(2) Date: Jan. 19, 2018

(87) PCT Pub. No.: WO2017/014544
PCT Pub. Date: Jan. 26, 2017

(65) Prior Publication Data
US 2018/0216958 A1  Aug. 2, 2018

(30) Foreign Application Priority Data

Jul. 20, 2015 (KR) .................. 10-2015-0102548

(51) Int. Cl.
*G01C 21/36* (2006.01)
*G06Q 30/02* (2012.01)
(Continued)

(52) U.S. Cl.
CPC ......... *G01C 21/3697* (2013.01); *B60W 10/04* (2013.01); *B60W 10/18* (2013.01);
(Continued)

(58) Field of Classification Search
CPC ............ G01C 21/3697; G01C 21/3484; G01C 21/3602; G01C 21/3608; G01C 21/3614;
(Continued)

(56) References Cited

U.S. PATENT DOCUMENTS

| | | | | |
|---|---|---|---|---|
| 6,812,888 | B2* | 11/2004 | Drury | G01C 21/3415 342/357.31 |
| 8,989,053 | B1* | 3/2015 | Skaaksrud | H04W 12/06 370/255 |
| 2016/0301698 | A1* | 10/2016 | Katara | G07B 13/02 |

FOREIGN PATENT DOCUMENTS

| | | | |
|---|---|---|---|
| JP | 2003315077 A | * | 11/2003 |
| JP | 2009080337 A | * | 4/2009 |

(Continued)

Primary Examiner — Marthe Y Marc-Coleman
(74) Attorney, Agent, or Firm — Fish & Richardson P.C.

(57) ABSTRACT

The present invention relates to an autonomous vehicle and an autonomous vehicle system having the same. The autonomous vehicle according to the present invention comprises: a plurality of cameras; a radar; a communication unit; a display; an audio output unit; and a processor which, in an autonomous driving mode, controls the autonomous vehicle so as to select any one of a plurality of routes toward a destination and perform autonomous driving along the selected route, to receive advertisement information from the outside when driving along the selected route, and to output the received advertisement information through at least one of a display or an audio output unit, the received advertisement information being variable for each of the plurality of routes. Due to this feature, it is possible to provide different advertisements for each route to the destination during autonomous driving.

19 Claims, 45 Drawing Sheets

(51) Int. Cl.
   *G05D 1/02* (2020.01)
   *G05D 1/00* (2006.01)
   *G01C 21/34* (2006.01)
   *B60W 50/14* (2020.01)
   *B60W 30/18* (2012.01)
   *B60W 10/20* (2006.01)
   *B60W 10/18* (2012.01)
   *B60W 10/04* (2006.01)

(52) U.S. Cl.
   CPC ............ *B60W 10/20* (2013.01); *B60W 30/18* (2013.01); *B60W 50/14* (2013.01); *G01C 21/3484* (2013.01); *G01C 21/3602* (2013.01); *G01C 21/3608* (2013.01); *G01C 21/3614* (2013.01); *G05D 1/0088* (2013.01); *G05D 1/0212* (2013.01); *G05D 1/0238* (2013.01); *G05D 1/0257* (2013.01); *G06Q 30/0241* (2013.01); *G06Q 30/0265* (2013.01); *G06Q 30/0266* (2013.01); *B60W 2050/146* (2013.01); *B60W 2420/42* (2013.01); *B60W 2420/52* (2013.01); *B60W 2540/043* (2020.02); *B60W 2540/21* (2020.02); *G05D 1/0246* (2013.01); *G05D 2201/0212* (2013.01)

(58) Field of Classification Search
   CPC ...... B60W 10/04; B60W 10/18; B60W 10/20; B60W 30/18; B60W 50/14; B60W 2050/146; B60W 2420/42; B60W 2420/52; B60W 2540/02; B60W 2540/28; G05D 1/0088; G05D 1/0257; G05D 2201/0212
   USPC .......................................................... 701/25
   See application file for complete search history.

(56) References Cited

FOREIGN PATENT DOCUMENTS

JP    2014016654 A  *  1/2014  ....... G08G 1/096741
JP    2015118438 A  *  6/2015

\* cited by examiner

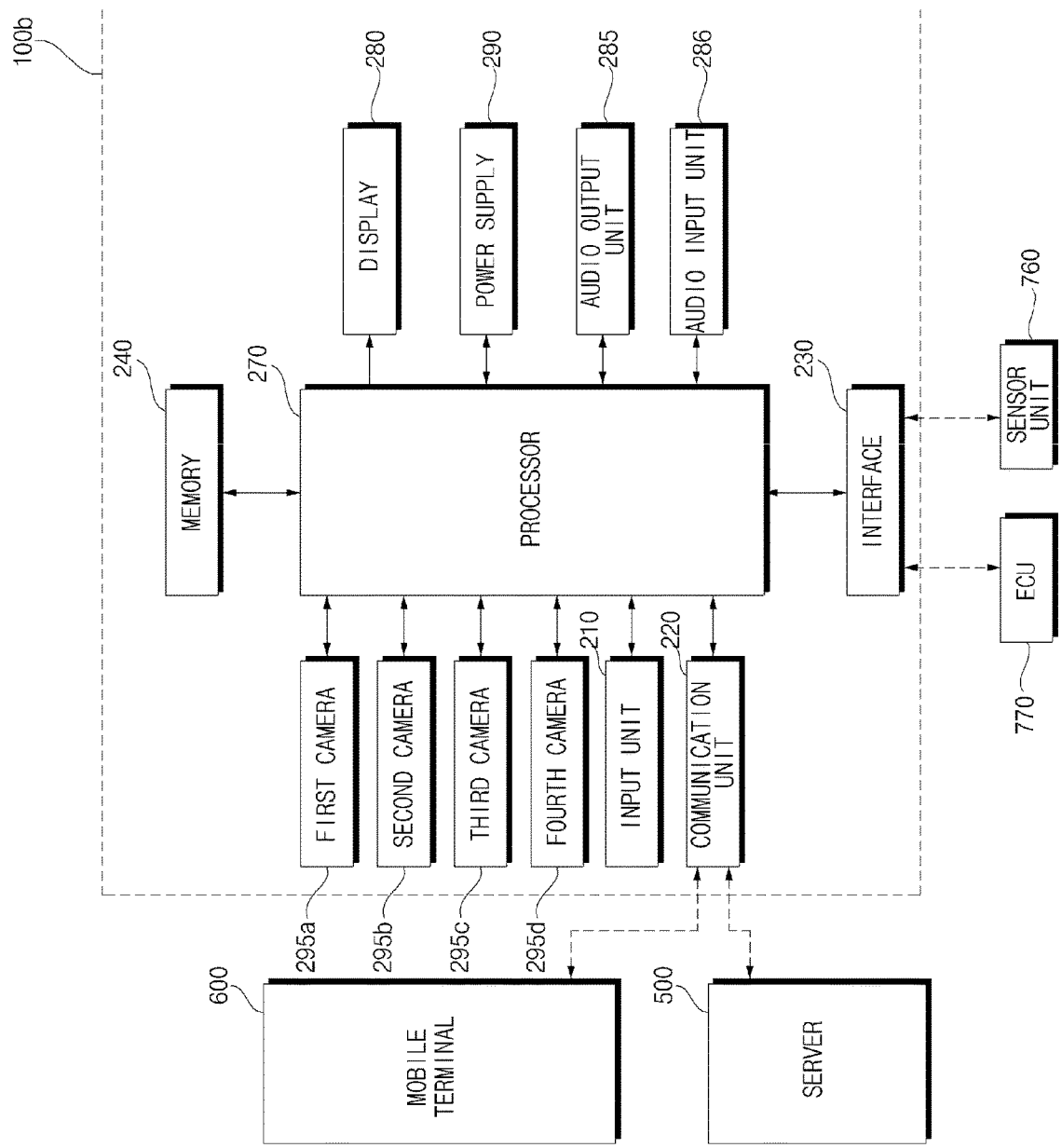

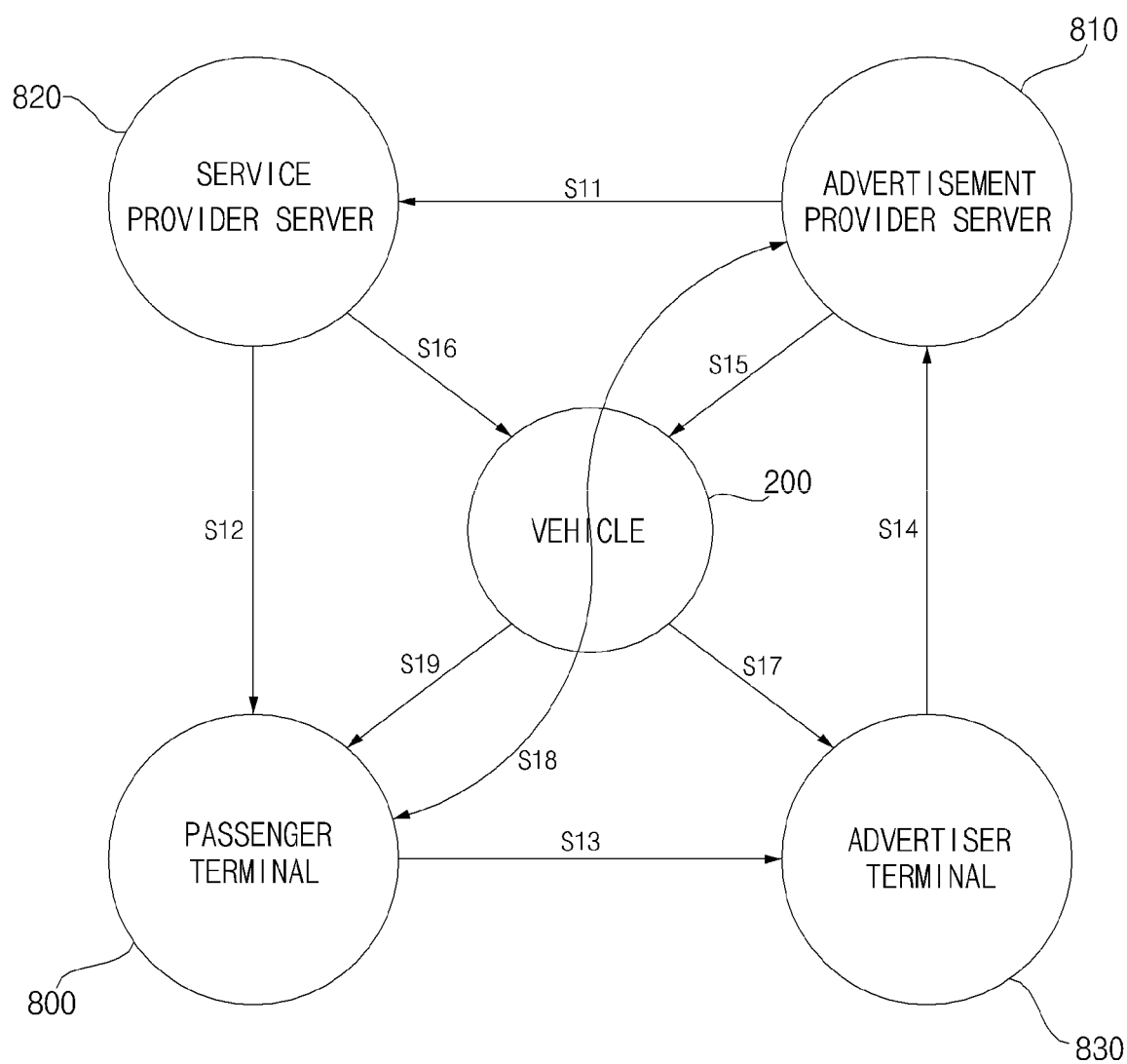

AUTONOMOUS VEHICLE AND AUTONOMOUS VEHICLE SYSTEM HAVING SAME

CROSS-REFERENCE TO RELATED APPLICATIONS

This application is a National Stage application under 35 U.S.C. § 371 of International Application No. PCT/KR2016/007883, filed Jul. 20, 2016, which claims the benefit of Korean Application No. 10-2015-0102548, filed on Jul. 20, 2015. The disclosures of the prior applications are incorporated by reference in their entirety.

TECHNICAL FIELD

The present invention relates to an autonomous vehicle and an autonomous vehicle system including the same and, more particularly, to an autonomous vehicle capable of providing different advertisements according to routes to a destination when the vehicle autonomously travels, and an autonomous vehicle system including the same.

BACKGROUND ART

A vehicle is an apparatus that allows a user who rides therein to drive the vehicle in a desired direction. A representative example of the vehicle may be an automobile.

Meanwhile, for convenience of the user who uses the vehicle, the vehicle is provided with, for example, various sensors and electronic devices. In particular, for example, various devices for user driving convenience are being developed. An image captured by a rear camera is provided upon reversing or parking a vehicle.

DISCLOSURE

Technical Problem

An object of the present invention devised to solve the problem lies in an autonomous vehicle capable of providing different advertisements according to routes to a destination when the vehicle autonomously travels, and an autonomous vehicle system including the same.

Technical Solution

The object of the present invention can be achieved by providing an autonomous vehicle including a plurality of cameras, a radar, a communication unit, a display, an audio output unit, and a processor to select any one of a plurality of routes to a destination in an autonomous mode, to control the vehicle to autonomously travel along the selected route, to receive advertisement information from the outside while the vehicle travels along the selected route, and to perform control to output the received advertisement information through at least one of the display or the audio output unit, wherein the received advertisement information is changed according to the plurality of routes.

Another object of the present invention, there is provided an autonomous vehicle including a plurality of cameras, a radar, a communication unit, a display, an audio output unit, and a processor to select any one of a plurality of routes to destination when any one of a plurality of pieces of advertisement information received through the communication unit is selected in an autonomous mode and to control the vehicle to autonomously travel along the selected route.

Another object of the present invention, there is provided an autonomous vehicle system including a vehicle to select any one of a plurality of routes to a destination in an autonomous mode, to control the vehicle to autonomously travel along the selected route, to receive advertisement information from the outside while the vehicle travels along the selected route, and to perform control to output the received advertisement information through at least one of a display or an audio output unit, an advertisement provider server to transmit the advertisement information to the vehicle, and a service provider server to receive cost information from the advertisement provider server and to provide a service corresponding to the cost information to the vehicle or a terminal of a driver of the vehicle.

Advantageous Effects

An autonomous vehicle according to an embodiment of the present invention includes a plurality of cameras, a radar, a communication unit, a display, an audio output unit, and a processor to select any one of a plurality of routes to a destination in an autonomous mode, to control the vehicle to autonomously travel along the selected route, to receive advertisement information from the outside while the vehicle travels along the selected route, and to perform control to output the received advertisement information through at least one of the display or the audio output unit. The received advertisement information is changed according to the plurality of routes. Therefore, it is possible to provide different advertisements according to the routes to the destination when the vehicle autonomously travels.

By selectively outputting some of the received advertisement information based on driver information of the vehicle, passenger information or vehicle information, it is possible to output advertisement information suitable for the preference of the driver or passenger.

By transmitting, to the outside, advertisement output time information, advertisement viewing time information of a passenger in the vehicle or viewing response information of the passenger in the vehicle upon advertisement output, it is possible to receive various services according to advertisement information output or viewing.

An autonomous vehicle according to another embodiment of the present invention includes a plurality of cameras, a radar, a communication unit, a display, an audio output unit, and a processor to select any one of a plurality of routes to destination when any one of a plurality of pieces of advertisement information received through the communication unit is selected in an autonomous mode and to control the vehicle to autonomously travel along the selected route, thereby providing the route changed according to advertisement information.

An autonomous vehicle system according to another embodiment of the present invention includes a vehicle to select any one of a plurality of routes to a destination in an autonomous mode, to control the vehicle to autonomously travel along the selected route, to receive advertisement information from the outside while the vehicle travels along the selected route, and to perform control to output the received advertisement information through at least one of a display or an audio output unit, an advertisement provider server to transmit the advertisement information to the vehicle, and a service provider server to receive cost information from the advertisement provider server and to provide a service corresponding to the cost information to the vehicle or a terminal of a driver of the vehicle, thereby changing advertisement information according to the selected route and providing various services to the vehicle or the terminal of the driver of the vehicle according to viewing of advertisement information.

DESCRIPTION OF DRAWINGS

FIGS. 3C to 3D are block diagrams showing various examples of the internal configuration of the autonomous driving apparatus of FIG. 1.

FIG. 8 is a diagram showing an autonomous vehicle system according to an embodiment of the present invention.

BEST MODE

The present invention will now be described in detail with reference to the accompanying drawings.

The suffixes "module" and "unit" of elements herein are used for convenience of description and thus can be used interchangeably and do not have any distinguishable meanings or functions.

A vehicle as described in this specification may include an automobile and a motorcycle. Hereinafter, an automobile will be focused upon.

A vehicle as described in this specification may include all of a vehicle including an engine as a power source, a hybrid vehicle including both an engine and an electric motor as a power source, and an electric vehicle including an electric motor as a power source.

Figure 1:
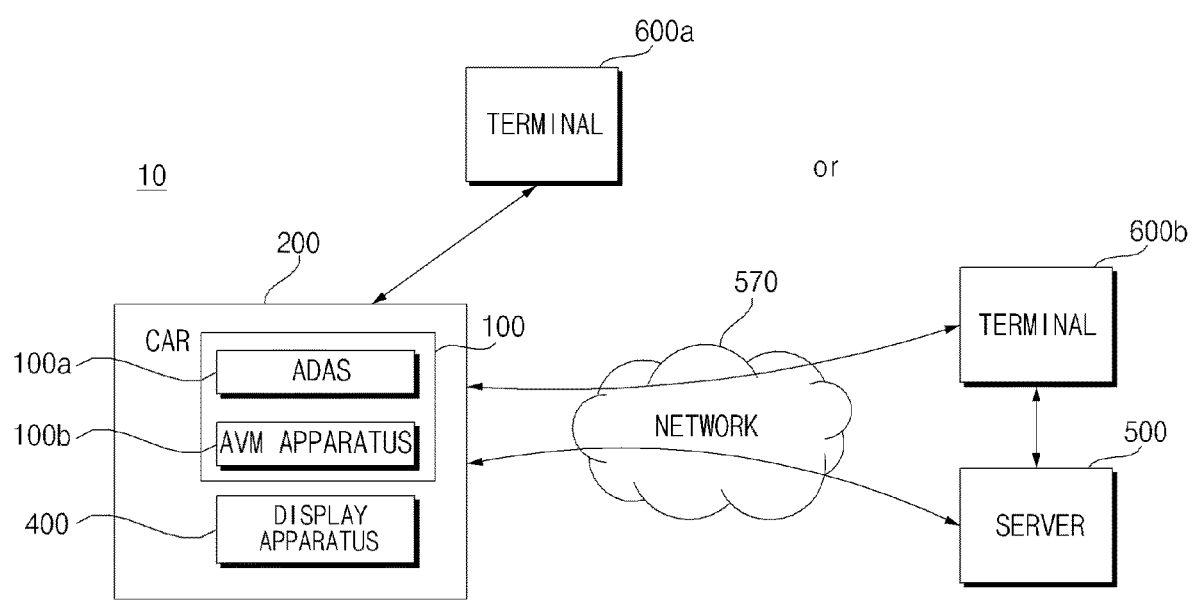
FIG. 1 is a diagram showing the concept of a vehicle communication system including an autonomous driving apparatus according to an embodiment of the present invention.

FIG. 1 is a diagram showing the concept of a vehicle communication system including an autonomous driving apparatus according to an embodiment of the present invention.

Referring to the figure, the vehicle communication system may include a vehicle 200, terminals 600a and 600b and a server 500.

The vehicle 200 may include an autonomous driving apparatus 100 and a vehicle display apparatus 400.

Meanwhile, the autonomous driving apparatus 100 may include an advanced driver assistance system (ADAS) 100a and an around view monitoring (AVM) apparatus 100b.

For example, when a vehicle autonomously travels, the vehicle may be autonomously driven through the ADAS 100a at a predetermined speed or more and may be autonomously driven through the around view monitoring apparatus 100b at less than the predetermined speed.

As another example, the ADAS 100a and the around view monitoring apparatus 100b simultaneously operate to autonomously drive the vehicle. However, when the vehicle travels at a predetermined speed or more, a weight may be given to the ADAS 100a to mainly perform autonomous driving of the vehicle using the ADAS 100a and, when the vehicle travels at less than the predetermined speed, a weight is given to the around view monitoring apparatus 100b to mainly perform autonomous driving of the vehicle using the around view monitoring apparatus 100b.

Meanwhile, the ADAS 100a, the around view monitoring apparatus 100b, and the vehicle display apparatus 400 may exchange data with the terminals 600a and 600b or the server 500 using a communication unit (not shown) provided therein or a communication unit provided in the vehicle 200.

For example, if the mobile terminal 600a is located inside or near the vehicle, at least one of the ADAS 100a, the around view monitoring apparatus 100b and the vehicle display apparatus 400 exchange data with the terminal 600a through short-range communication.

As another example, if the terminal 600b is far away from the vehicle, at least one of the ADAS 100a, the around view monitoring apparatus 100b and the vehicle display apparatus 400 may exchange data with the terminal 600b or the server 500 over a network 570 using long-distance communication (mobile communication, etc.).

The terminals 600a and 600b may be mobile terminals such as cellular phones, smartphones, tablet PCs or wearable devices such as smart watches or fixed terminals such as TVs or monitors. Hereinafter, a mobile terminal such as a smartphone will be focused upon as the terminal 600.

Meanwhile, the server 500 may be a sever provided by a vehicle manufacturer or a server managed by a provider for providing a vehicle related service. For example, the server may be a server managed by a provider for providing information on road and traffic conditions.

Meanwhile, the ADAS 100a may process a stereo image received from a stereo camera 195 based on computer vision and generate and provide vehicle related information. Here, the vehicle related information may include vehicle control information for directly controlling a vehicle or driver assistance information for guiding a driver.

Alternatively, the ADAS 100a may generate and provide a control signal for autonomously driving a vehicle based on the stereo image received from the stereo camera 195 and distance information of the object located near the vehicle, which is received from a radar 797. For example, the ADAS may output a control signal for controlling at least one of a steering drive unit, a brake drive unit or a power source drive unit upon autonomously driving the vehicle.

The around view monitoring apparatus 100b may deliver a plurality of images captured by a plurality of cameras 295a, 295b, 295c and 295d to the processor (270 of FIG. 3c or 3d) of the vehicle 200 and the processor (270 of FIG. 3c or 3d) may synthesize the plurality of images to generate and provide an around view image.

The vehicle display apparatus 400 may be an audio/video navigation (AVN) apparatus.

The vehicle display apparatus 400 may include a space recognition sensor unit and a touch sensor unit. Long-distance approach may be sensed through the space recognition sensor unit and short-distance touch approach may be sensed through the touch sensor unit. A user interface corresponding to sensed user gesture or touch may be provided.

The vehicle 200 according to an embodiment of the present invention may select one of a plurality of routes to a destination in an autonomous mode, perform control to be autonomously driven along the selected route, receive advertisement information from the outside upon driving the vehicle along the selected route, and output the received advertisement information through at least one of a display or an audio output unit. At this time, the received advertisement information may be changed according to the plurality of routes. Therefore, it is possible to provide different advertisements according to the routes to the destination.

In the vehicle 200 according to another embodiment of the present invention, if any one of the plurality of pieces of advertisement information received through the communication unit is selected in an autonomous mode, any one of the plurality of routes to a destination may be selected based on the selected advertisement information and the vehicle may be autonomously driven along the selected route. Therefore, it is possible to provide a route that has been changed according to the advertisement information.

Figure 2A:
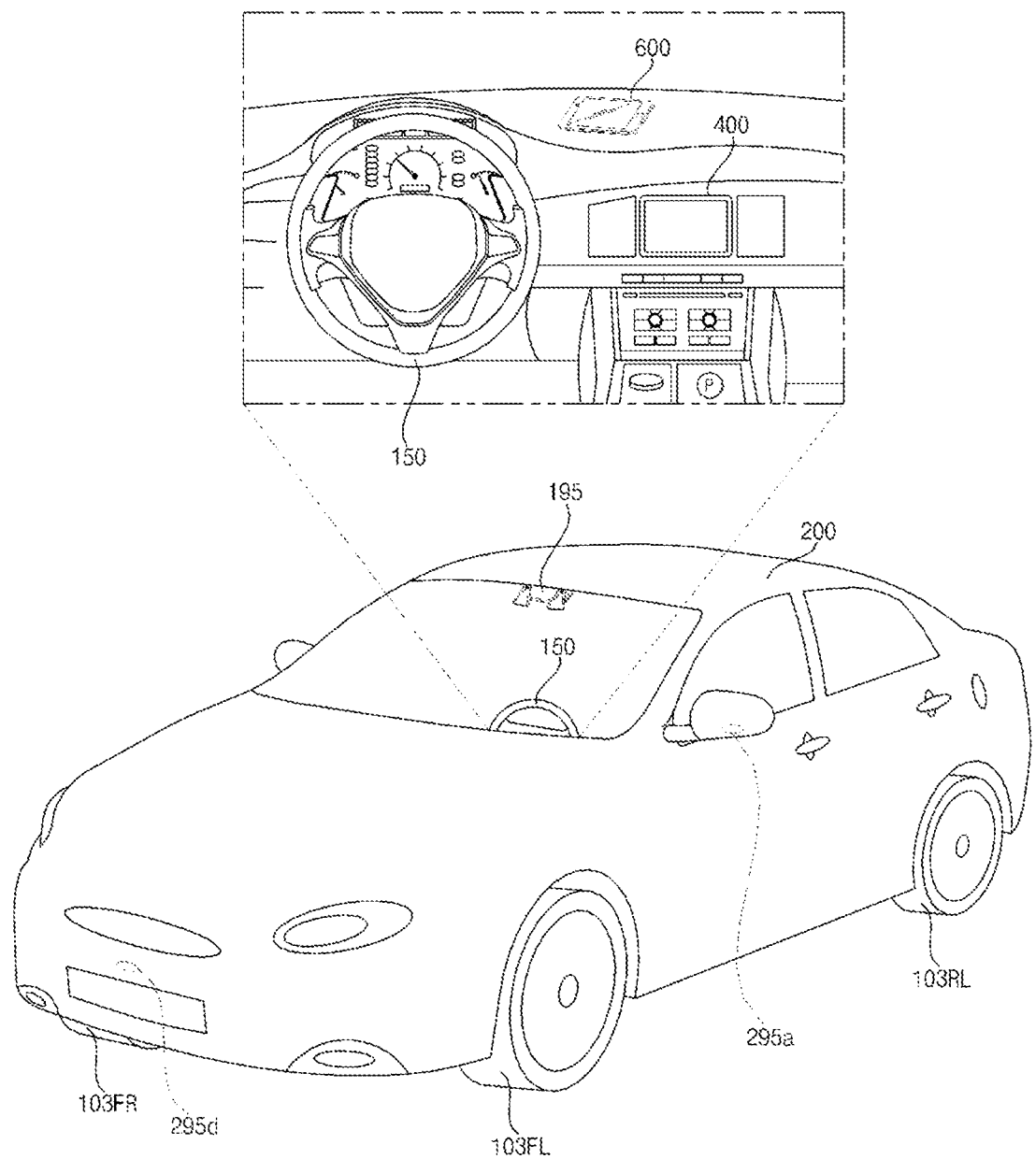
FIG. 2A is a diagram showing the appearance of a vehicle including various cameras.

FIG. 2a is a diagram showing the appearance of a vehicle including various cameras.

Referring to the figure, the vehicle 200 may include wheels 203FR, 103FL, 103RL, . . . rotated by a power source, a steering wheel 250 for controlling the direction of travel of the vehicle 200, the stereo camera 195 provided in the vehicle 200 for the ADAS 100a of FIG. 1, and a plurality of cameras 295a, 295b, 295c, 295d mounted in the vehicle 200 for the autonomous driving apparatus 100b of FIG. 1. In the figure, for convenience, only the left camera 295a and the front camera 295d are shown.

Figure 3A:
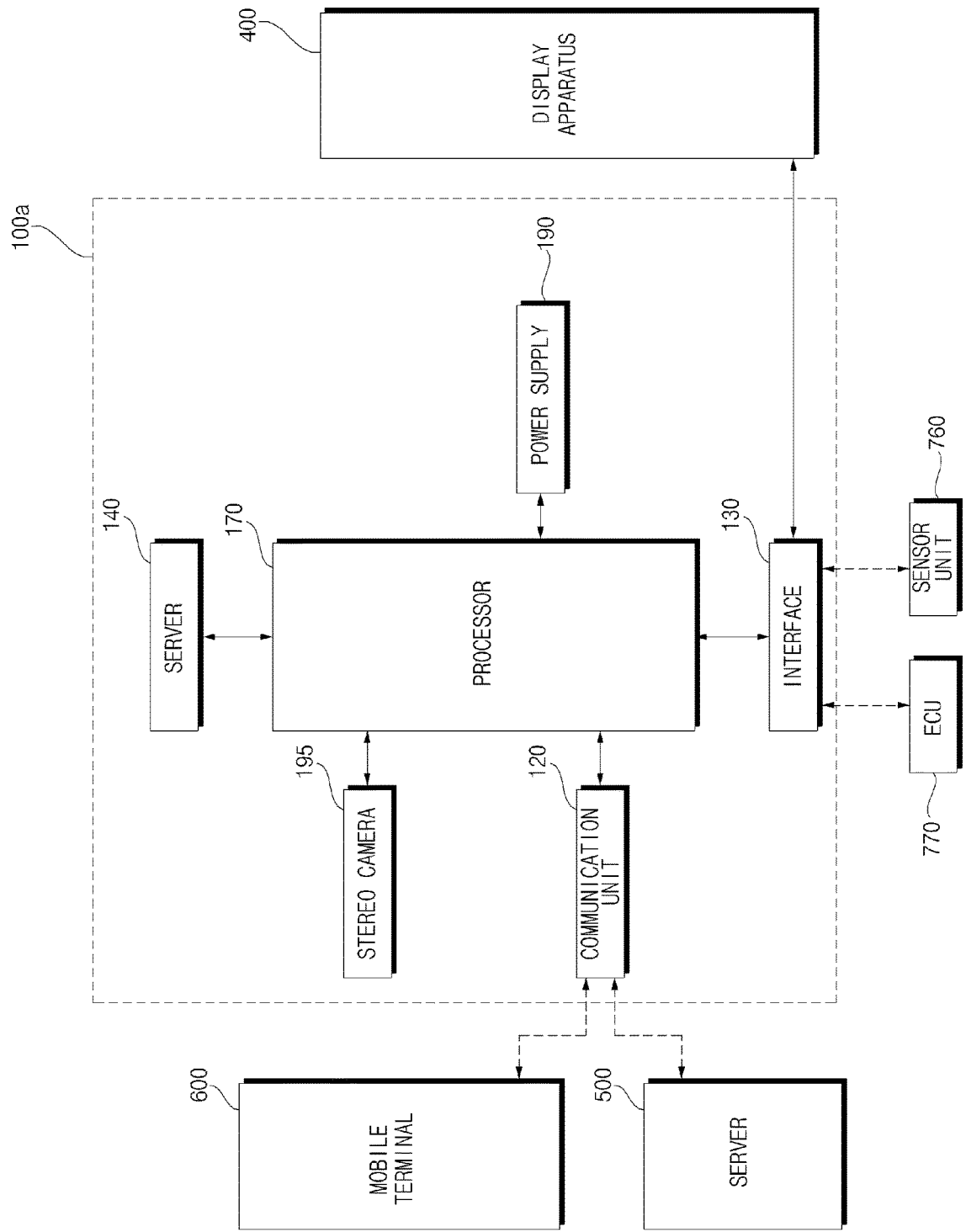
FIGS. 3A to 3B are block diagrams showing various examples of the internal configuration of the autonomous driving apparatus of FIG. 1.

The stereo camera 195 may include a plurality of cameras and a stereo image acquired by the plurality of cameras may be processed by the ADAS (100a of FIG. 3a).

In the figure, the stereo camera 195 includes two cameras.

The plurality of cameras 295a, 295b, 295c and 295d may be activated to acquire captured images when the speed of the vehicle is equal to or less than a predetermined speed or when the vehicle is reversed. The images acquired by the plurality of cameras may be processed by the around view monitoring apparatus (100b of FIG. 3c or 3d).

Figure 2B:
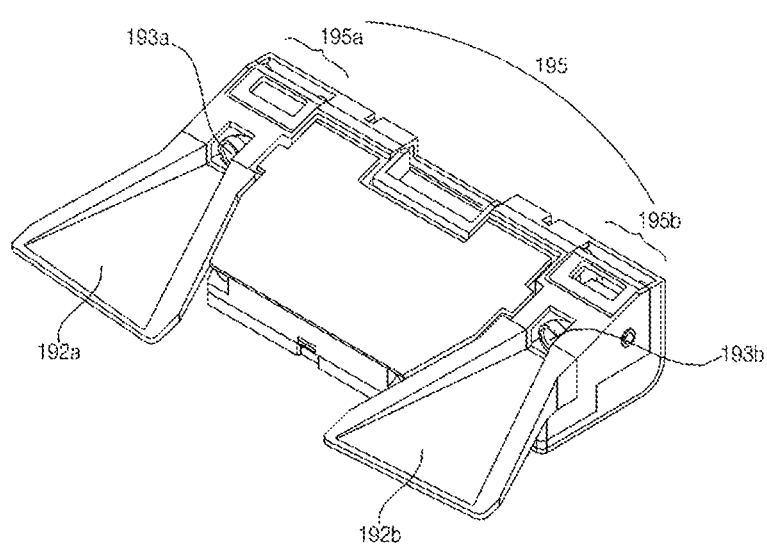
FIG. 2B is a diagram showing the appearance of a stereo camera attached to the vehicle of FIG. 2A.

FIG. 2b is a diagram showing the appearance of a stereo camera attached to the vehicle of FIG. 2a.

Referring to the figure, a stereo camera module 195 may include a first camera 195a including a first lens 193a and a second camera 195b including a second lens 193b.

The stereo camera module 195 may include a first light shield unit 192a and a second light shield unit 192b for respectively shielding light incident upon the first lens 193a and the second lens 193b.

The stereo camera module 195 of the figure may be detachably provided on the ceiling or windshield of the vehicle 200.

The ADAS (100a of FIG. 3a) including the stereo camera module 195 may acquire a stereo image of the front side of the vehicle from the stereo camera module 195, perform disparity detection based on the stereo image, detect an object from at least one stereo image based on disparity information, and continuously track motion of the object after object detection.

Figure 2C:
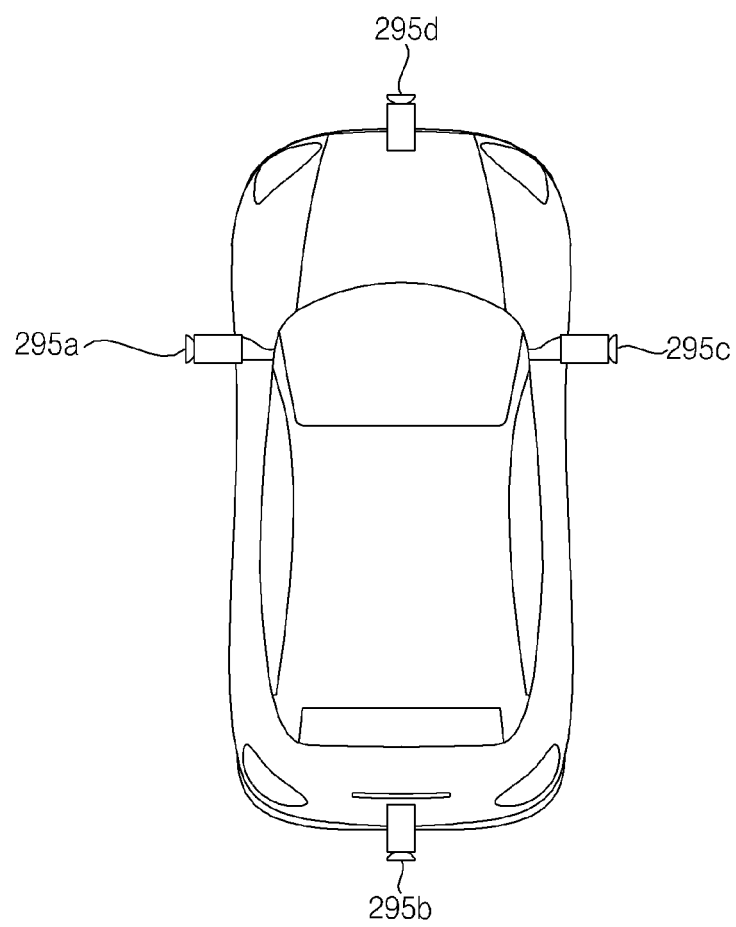
FIG. 2C is a schematic diagram showing the positions of a plurality of cameras attached to the vehicle of FIG. 2A.
Figure 2D:
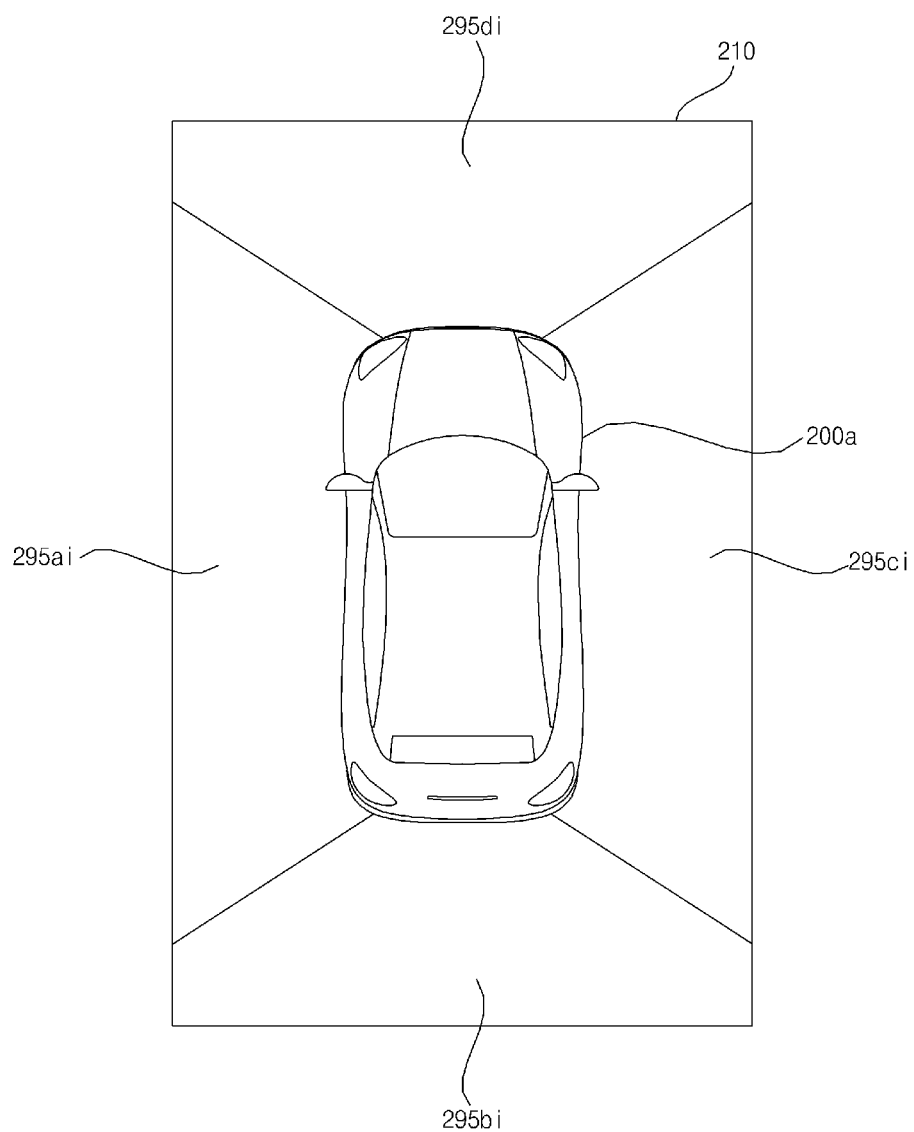
FIG. 2D is a diagram showing an around view image based on images captured by the plurality of cameras of FIG. 2C.

FIG. 2c is a schematic diagram showing the positions of a plurality of cameras attached to the vehicle of FIG. 2a, and FIG. 2d is a diagram showing an around view image based on images captured by the plurality of cameras of FIG. 2c.

First, referring to FIG. 2c, the plurality of cameras 295a, 295b, 295c and 295d may be disposed at the left, rear, right and front sides of the vehicle, respectively.

In particular, the left camera 295a and the right camera 295c may be disposed in a case surrounding a left side-view mirror and a case surrounding a right side-view mirror, respectively.

The rear camera 295b and the front camera 295d may be disposed near a trunk switch or on or near an emblem.

The plurality of images captured by the plurality of cameras 295a, 295b, 295c and 295d is delivered to a processor (270 of FIG. 3c or 3d) of the vehicle 200 and the processor (270 of FIG. 3c or 3d) synthesizes the plurality of images to generate an around view image.

FIG. 2d shows an example of the around view image 210. The around view image 210 may include a first image area 295ai of the left camera 295a, a second image area 295bi of the rear camera 295b, a third image area 295ci of the right camera 295c and a fourth image area 295di of the front camera 295d.

Figure 3B:
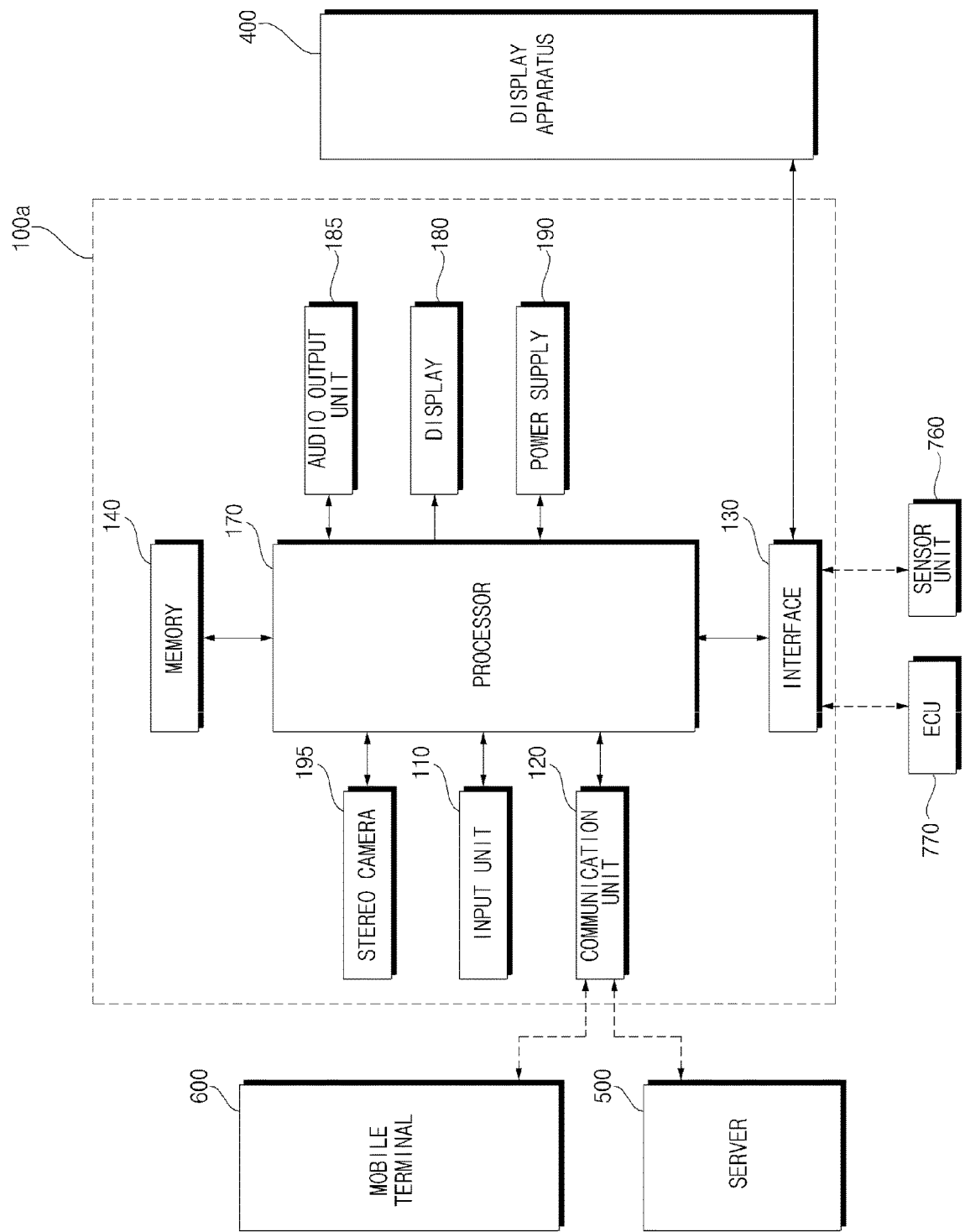

FIGS. 3a to 3b are block diagrams showing various examples of the internal configuration of the autonomous driving apparatus of FIG. 1.

FIGS. 3a to 3b are block diagrams showing the internal configuration of the ADAS 100a of the autonomous driving apparatus 100.

The ADAS 100a may process the stereo image received from the stereo camera 195 based on computer vision and generate vehicle related information. Here, the vehicle related information may include vehicle control information for directly controlling a vehicle or driver assistance information for guiding a driver.

First, referring to FIG. 3a, the ADAS 100a of FIG. 3a may include a communication unit 120, an interface 130, a memory 130, a processor 170, a power supply 190 and the stereo camera 195.

The communication unit 120 may exchange data with a mobile terminal 600 or a server 500 in a wireless manner. In particular, the communication unit 120 may exchange data with the mobile terminal of the driver in a wireless manner. The wireless communication method may include various data communication methods such as Bluetooth, Wi-Fi Direct, Wi-Fi or APiX.

The communication unit 120 may receive weather information and road traffic situation information, e.g., Transport Protocol Experts Group (TPEG) information, from the mobile terminal 600 or the server 500. The ADAS 100a may transmit real-time traffic information obtained based on the stereo images to the mobile terminal 600 or the server 500.

When a user gets into the vehicle, the mobile terminal 600 of the user and the ADAS 100a may pair with each other automatically or as the user executes an application.

The interface 130 may receive vehicle related data or transmit signals processed or generated in the processor 170 to an external device. The interface 130 may perform data communication with an ECU 770, an audio/video navigation (AVN) apparatus 400 and a sensor unit 760 using a wired or wireless communication method.

The interface 130 may receive map information related to vehicle driving through data communication with the vehicle display apparatus 400.

The interface 130 may receive sensor information from the ECU 770 or the sensor unit 760.

The sensor information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Such sensor information may be acquired by a heading sensor, a yaw sensor, a gyro sensor, a position module, a vehicle forward/reverse sensor, a wheel sensor, a vehicle speed sensor, a gradient sensor, a battery sensor, a fuel sensor, a tire sensor, a steering sensor based on rotation of the steering wheel, a vehicle interior temperature sensor, a vehicle interior humidity sensor, etc. The position module may include a GPS module for receiving GPS information.

Information related to vehicle driving, such as vehicle direction information, vehicle position information, vehicle angle information, vehicle speed information and vehicle tilt information, may be referred to as vehicle driving information.

The memory 140 may store a variety of data for overall operation of the ADAS 100a, such as a program for processing or control of the processor 170.

An audio output unit (not shown) converts an electrical signal from the processor 170 into an audio signal and outputs the audio signal. The audio output unit may include a speaker. The audio output unit (not shown) may output sound corresponding to operation of the input unit 110, that is, a button.

An audio input unit (not shown) may receive user voice and may include a microphone. The received voice may be converted into an electrical signal and the electrical signal may be delivered to the processor 170.

The processor 170 controls overall operation of the units of the ADAS 100a.

In particular, the processor 170 performs signal processing based on computer vision. Therefore, the processor 170 may acquire a stereo image of the front side of the vehicle from the stereo camera module 195, perform disparity calculation of the front side of the vehicle based on the stereo image, detect an object from at least one stereo image based on disparity information, and continuously track motion of the object after object detection.

In particular, the processor 170 may perform lane detection, peripheral vehicle detection, pedestrian detection, traffic sign detection, road surface detection, etc. upon object detection.

The processor 170 may perform calculation of a distance from a detected peripheral vehicle, calculation of the speed of the detected peripheral vehicle, and calculation of a difference with the speed of the detected peripheral vehicle.

The processor 170 may receive weather information and road traffic situation information, e.g., Transport Protocol Experts Group (TPEG) information, through the communication unit 120.

The processor 170 may check the traffic situation information in the vicinity of the vehicle based on the stereo image in the ADAS 100a.

The processor 170 may receive map information from the vehicle display apparatus 400 through the interface 130.

The processor 170 may receive sensor information from the ECU 770 or the sensor unit 760 through the interface 130. The sensor information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

The power supply 190 may supply power required to operate the respective components under control of the processor 170. In particular, the power supply 190 may receive power from, for example, a battery (not illustrated) inside the vehicle.

The stereo camera 195 may include a plurality of cameras. Hereinafter, assume that the stereo camera 195 includes two cameras as described with reference to FIG. 2b.

The stereo camera 195 may be detachably provided on the ceiling or windshield of the vehicle 200 and may include a first camera 195a including a first lens 193a and a second camera 195b including a second lens 193b.

The stereo camera module 195 may include a first light shield unit 192a and a second light shield unit 192b for respectively shielding light incident upon the first lens 193a and the second lens 193b.

Next, referring to FIG. 3b, the ADAS 100a of FIG. 3b may further include an input unit 110, a display 180 and an audio output unit 185, as compared to the ADAS 100a of FIG. 3a. Hereinafter, only the input unit 110, the display 180 and the audio output unit 185 will be described.

The input unit 110 may include a plurality of buttons attached to the ADAS 100a and, more particularly, to the stereo camera 195 or a touchscreen. The ADAS 100a may be powered on through the plurality of buttons or the touchscreen. Various other input operations may be performed.

The display 180 may display an image related to operation of the ADAS. In order to display the image, the display 180 may include a cluster or a head up display (HUD) located at the internal front side of the vehicle. When the display 180 is a HUD, a projection module for projecting an image on the windshield of the vehicle 200 may be included.

The audio output unit 185 may output sound based on the audio signal processed by the processor 170. The audio output unit 185 may include at least one speaker.

Figure 3C:
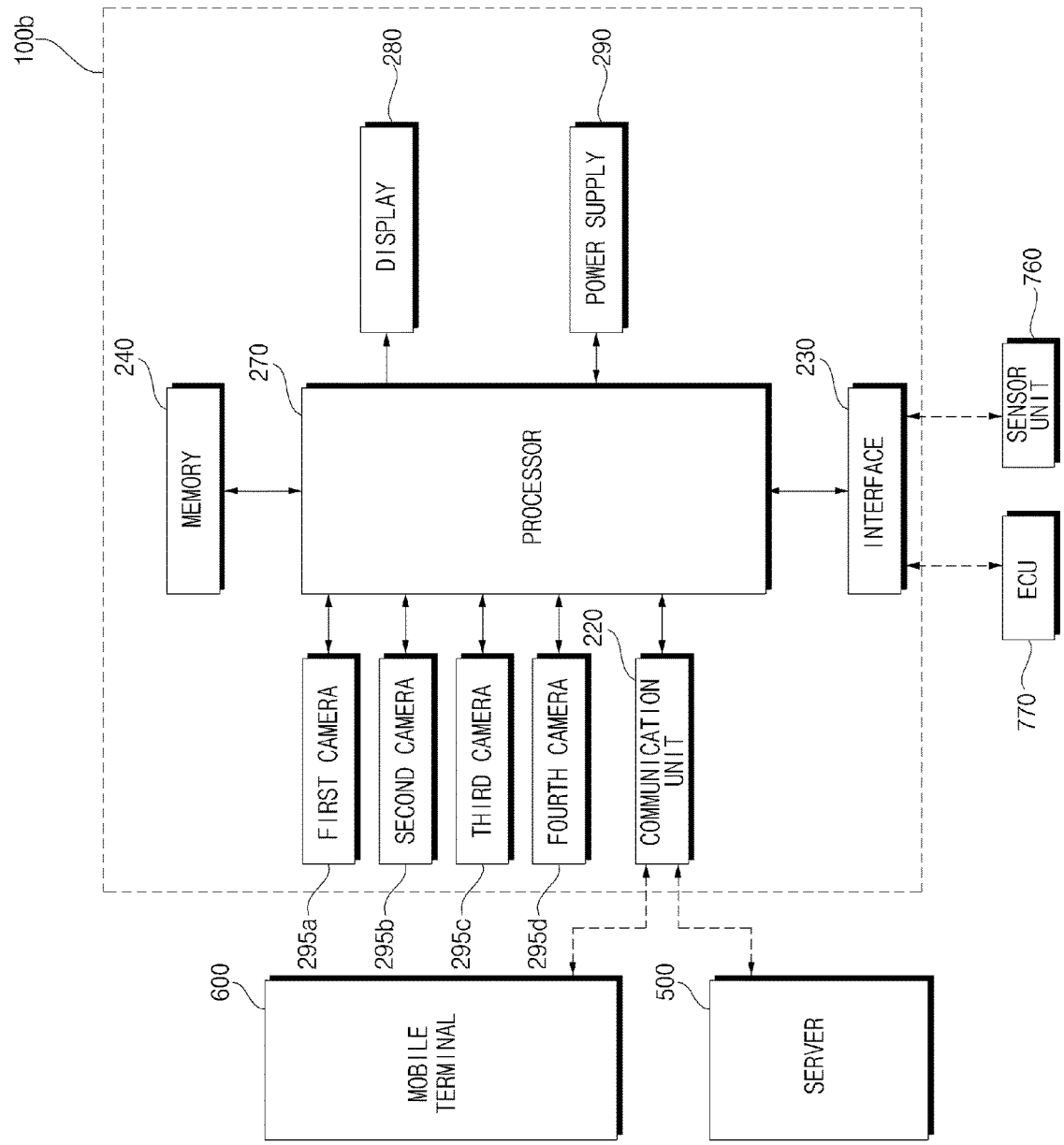

FIGS. 3c to 3d are block diagrams showing various examples of the internal configuration of the autonomous driving apparatus of FIG. 1.

FIGS. 3c to 3d are block diagrams showing the internal configuration of the around view monitoring apparatus 100b of the autonomous driving apparatus 100.

The around view monitoring apparatus 100b of FIGS. 3c to 3d may synthesize a plurality of images received from the plurality of cameras 295a, . . . , 295d to generate an around view image.

The around view monitoring apparatus 100b may detect, verify and track an object located near the vehicle based on the plurality of images received from the plurality of cameras 295a, . . . , 295d.

First, referring to FIG. 3c, the around view monitoring apparatus 100b of FIG. 3c may include a communication unit 220, an interface 230, a memory 240, a processor 270, a display 280, a power supply 290 and a plurality of cameras 295a, . . . , 295d.

The communication unit 220 may exchange data with a mobile terminal 600 or a server 500 in a wireless manner. In particular, the communication unit 220 may exchange data with the mobile terminal of the driver in a wireless manner. The wireless communication method may include various data communication methods such as Bluetooth, Wi-Fi Direct, Wi-Fi or APiX.

The communication unit 220 may receive a schedule of a driver, schedule information related to a movement position, weather information and road traffic situation information, e.g., Transport Protocol Experts Group (TPEG) information, from the mobile terminal 600 or the server 500. The around view monitoring apparatus 100*b* may transmit real-time traffic information obtained based on the images to the mobile terminal 600 or the server 500.

When a user gets into the vehicle 100, the mobile terminal 600 of the user and the around view monitoring apparatus 100*b* may pair with each other automatically or as the user executes an application.

The interface 230 may receive vehicle related data or transmit signals processed or generated in the processor 270 to an external device. The interface 230 may perform data communication with an ECU 770 or a sensor unit 760 using a wired or wireless communication method.

The interface 230 may receive sensor information from the ECU 770 or the sensor unit 760.

The sensor information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Information related to vehicle driving, such as vehicle direction information, vehicle position information, vehicle angle information, vehicle speed information and vehicle tilt information, may be referred to as vehicle driving information.

The memory 240 may store a variety of data for overall operation of the around view monitoring apparatus 100*b*, such as a program for processing or control of the processor 270.

The memory 240 may store map information related to vehicle driving.

The processor 270 controls overall operation of the units of the around view monitoring apparatus 100*b*.

In particular, the processor 270 may acquire the plurality of images from the plurality of cameras 295*a*, . . . , 295*d*, and synthesize the plurality of images to generate the around view image.

In particular, the processor 270 performs signal processing based on computer vision. For example, the processor may perform disparity calculation of the vicinity of the vehicle based on the plurality of images or the generated around view image, perform object detection within the image based on the calculated disparity information, and continuously track motion of an object after object detection.

In particular, the processor 270 may perform lane detection, peripheral vehicle detection, pedestrian detection, obstacle detection, parking area detection and road surface detection, etc. upon object detection.

The processor 270 may calculate a distance from a detected peripheral vehicle or pedestrian.

The processor 270 may receive sensor information from the ECU 770 or the sensor unit 760 through the interface 230. The sensor information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

The display 280 may display the around view image generated by the processor 270. Upon displaying the around view image, various user interfaces may be provided and a touch sensor for enabling touch input through the provided user interface may be included.

The display 280 may include a cluster or a head up display (HUD) located at the internal front side of the vehicle. When the display 280 is a HUD, a projection module for projecting an image on the windshield of the vehicle 200 may be included.

The power supply 290 may supply power required to operate the respective components under control of the processor 270. In particular, the power supply 290 may receive power from, for example, a battery (not illustrated) inside the vehicle.

The plurality of cameras 295*a*, 295*b*, 295*c* and 295*d* may be wide angle cameras in order to provide the around view image.

Next, referring to FIG. 3*d*, the around view monitoring apparatus 100*b* of FIG. 3*d* is similar to the around view monitoring apparatus 100*b* of FIG. 3*c* but is different therefrom in that an input unit 210, an audio output unit 285, and an audio input unit 286 are further included. Hereinafter, only the input unit 210, the audio output unit 285 and the audio input unit 286 will be described.

The input unit 210 may include a plurality of buttons around the display 280 or a touchscreen provided on the display 280. The around view monitoring apparatus 100*b* may be powered on through the plurality of buttons or the touchscreen. Various other input operations may be performed.

The audio output unit 285 may output convert the electrical signal from the processor 270 into an audio signal and output the audio signal. The audio output unit may include at least one speaker. The audio output unit 285 may output sound corresponding to operation of the input unit 210, that is, the button.

The audio input unit 286 may receive user voice. To this end, the audio input unit may include a microphone. The received voice may be converted into an electrical signal and delivered to the processor 270.

The around view monitoring apparatus 100*b* of FIG. 3*c* or 3*d* may be an audio/video navigation (AVN) apparatus.

Figure 3E:
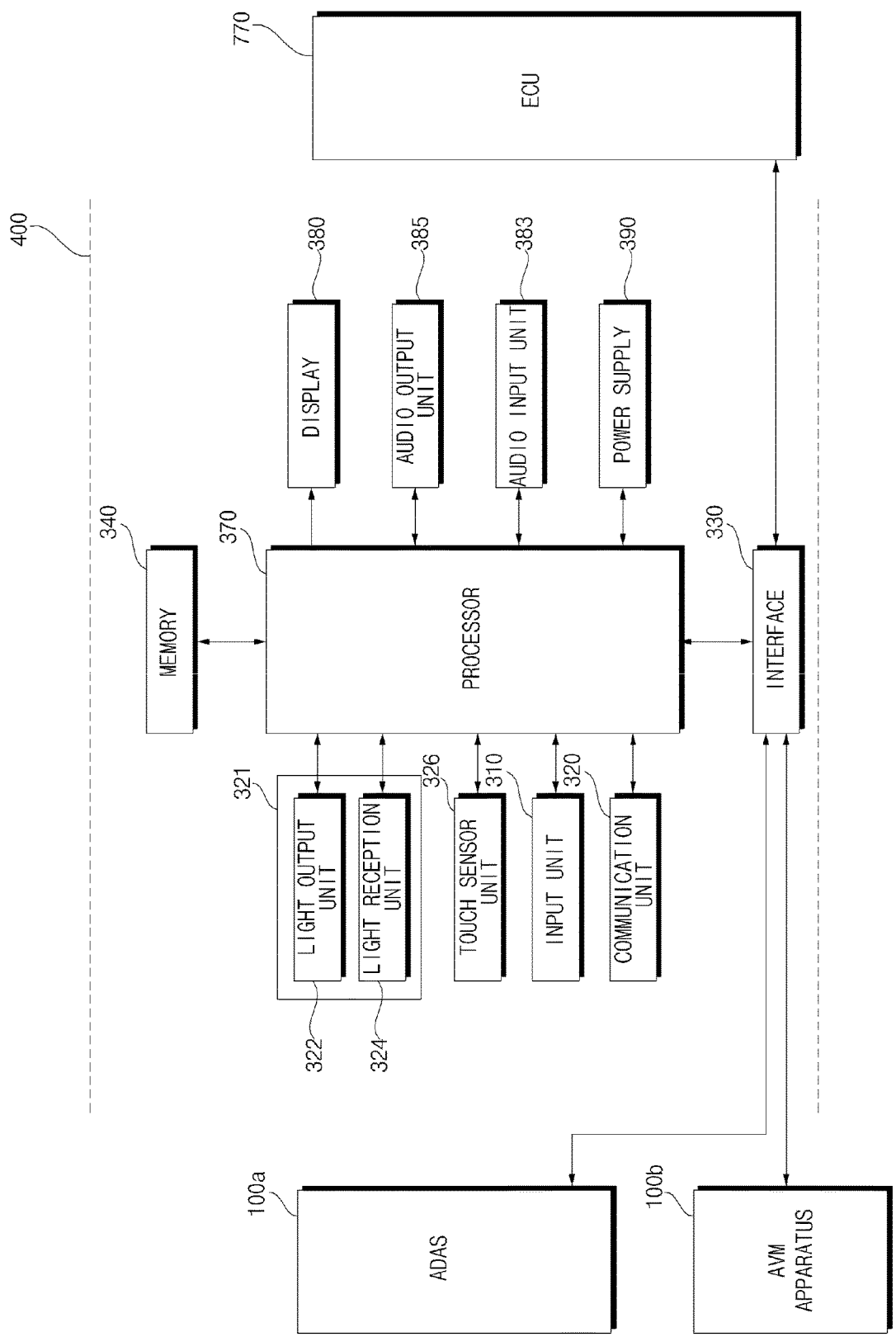
FIG. 3E is a block diagram showing the internal configuration of a vehicle display apparatus of FIG. 1.

FIG. 3*e* is a block diagram showing the internal configuration of the vehicle display apparatus of FIG. 1.

Referring to the figure, the vehicle display apparatus 400 according to the embodiment of the present invention may include an input unit 310, a communication unit 320, a space sensor 321, a touch sensor 326, an interface 330, a memory 340, a processor 370, a display 380, an audio input unit 383, an audio output unit 385 and a power supply 390.

The input unit 310 includes a button attached to the display apparatus 400, for example, a power button. In addition, the input unit may further include at least one of a menu button, up and down buttons and left and right buttons.

The input signal received by the input unit 310 may be sent to the processor 370.

The communication unit 320 may exchange data with an adjacent electronic apparatus, for example, an in-vehicle electronic apparatus or a server (not shown) wirelessly. In particular, the communication unit may exchange data with a mobile terminal of a driver wirelessly. A wireless data communication method may include various data communication methods such as Bluetooth, Wi-Fi, APiX, etc.

For example, when a user gets into the vehicle, the mobile terminal of the user and the display apparatus 400 may pair with each other automatically or as the user executes an application.

The communication unit 320 may include a GPS reception apparatus and may receive GPS information, that is, vehicle position information, via the GPS reception apparatus.

The space sensor 321 may sense approaching or movement of a user's hand. The space sensor may be provided in the vicinity of the display 480.

The space sensor 321 may perform space recognition based on light or ultrasonic waves. Hereinafter, space recognition based on light will be focused upon.

The space sensor 321 may sense approaching or movement of the user's hand based on output of light and reception of received light corresponding thereto. In particular, the processor 370 may perform signal processing with respect to an electrical signal of the output light and the received light.

The space sensor 321 may include a light output unit 322 and a light reception unit 324.

The light output unit 122 may output infrared (IR) light in order to sense the user's hand positioned in front of the display apparatus 400.

When light output from the light output unit 322 is diffused at or reflected from the user's hand located in front of the display apparatus 400, the light reception unit 324 receives diffused or reflected light. Specifically, the light reception unit 324 may include a photodiode to convert the received light into an electrical signal via the photodiode. The converted electrical signal may be input to the processor 370.

The touch sensor 326 senses floating touch and direct touch. The touch sensor 326 may include an electrode array, an MCU, etc. If the touch sensor operates, the electrical signal is supplied to the electrode array and an electric field is formed on the electrode array.

The touch sensor 326 may operate when the intensity of light received by the space sensor 321 is equal to or greater than a first level.

That is, when the user's hand approaches the display apparatus within a predetermined distance, the electrical signal may be supplied to the electrode array of the touch sensor 326. By the electrical signal supplied to the electrode array, an electric field is formed on the electrode array and capacitance change is sensed using such electric field. Based on the sensed capacitance change, floating touch and direct touch are sensed.

In particular, through the touch sensor 326, z-axis information as well as x-axis information and y-axis information may be sensed according to approaching of the user's hand.

The interface 330 may exchange data with another electronic apparatus installed in the vehicle. For example, the interface 330 may perform data communication with an electronic control unit (ECU) of the vehicle by a wired communication method.

Specifically, the interface 330 may receive vehicle state information through data communication with the ECU of the vehicle.

Here, the vehicle state information may include at least one of battery information, fuel information, vehicle speed information, tire information, steering information based on rotation of the steering wheel, vehicle lamp information, vehicle interior temperature information, vehicle exterior temperature information and vehicle interior humidity information.

The interface 330 may further receive GPS information from the ECU of the vehicle. Alternatively, the interface may transmit GPS information received from the display apparatus 400 to the ECU.

The memory 340 may store a variety of data for operation of the display apparatus 400, such as programs for processing or control of the processor 370.

For example, the memory 340 may store a map for guiding a driving route of the vehicle.

As another example, the memory 340 may store user information and mobile terminal information of the user, for pairing with the mobile terminal of the user.

The audio output unit 385 may convert the electrical signal from the processor 370 into an audio signal and output the audio signal. The audio output unit may include a speaker. The audio output unit 385 may output sound corresponding to operation of the input unit 310, that is, the button.

The audio input unit 383 may receive user voice. The audio input unit may include a microphone. The received voice may be converted into an electrical signal and sent to the processor 370.

The processor 370 may control operation of each unit of the vehicle display apparatus 400.

When a user's hand continuously approaches the display apparatus 400, the processor 370 may continuously calculate x-, y- and z-axis information of the user's hand based on light received by the light reception unit 324. At this time, the z-axis information may be sequentially reduced.

When the user's hand approaches the display 480 by a second distance closer than a first distance, the processor 370 may perform control to operate the touch sensor 326. That is, the processor 370 may perform control to operate the touch sensor 326 if the intensity of the electrical signal from the space sensor 321 is equal to or greater than a reference level. Therefore, the electrical signal is supplied to the electrode array in the touch sensor 325.

The processor 370 may sense floating touch based on a sensing signal sensed by the touch sensor 326, when the user's hand is located within the second distance. In particular, the sensing signal may be a signal indicating capacitance change.

Based on such a sensing signal, the processor 370 may calculate x- and y-axis information of floating touch input and calculate z-axis information which is a distance between the display apparatus 400 and the user's hand, based on capacitance change.

The processor 370 may change grouping of the electrode array in the touch sensor 326 based on the distance to the user's hand.

Specifically, the processor 370 may change grouping of the electrode array in the touch sensor 326 based on approximate z-axis information calculated based on light received by the space sensor 321. As the distance increases, the size of an electrode array group may increase.

That is, the processor 370 may change the size of the touch sensing cell of the electrode array in the touch sensor 326 based on the distance information of the user's hand, that is, the z-axis information.

The display 480 may separately display an image corresponding to the function of a button. For image display, the display 480 may be implemented as various display modules such as an LCD or an OLED. The display 480 may be implemented as an in-vehicle cluster.

The power supply 390 may supply power necessary for operation of each component under control of the processor 370.

Figure 4A:
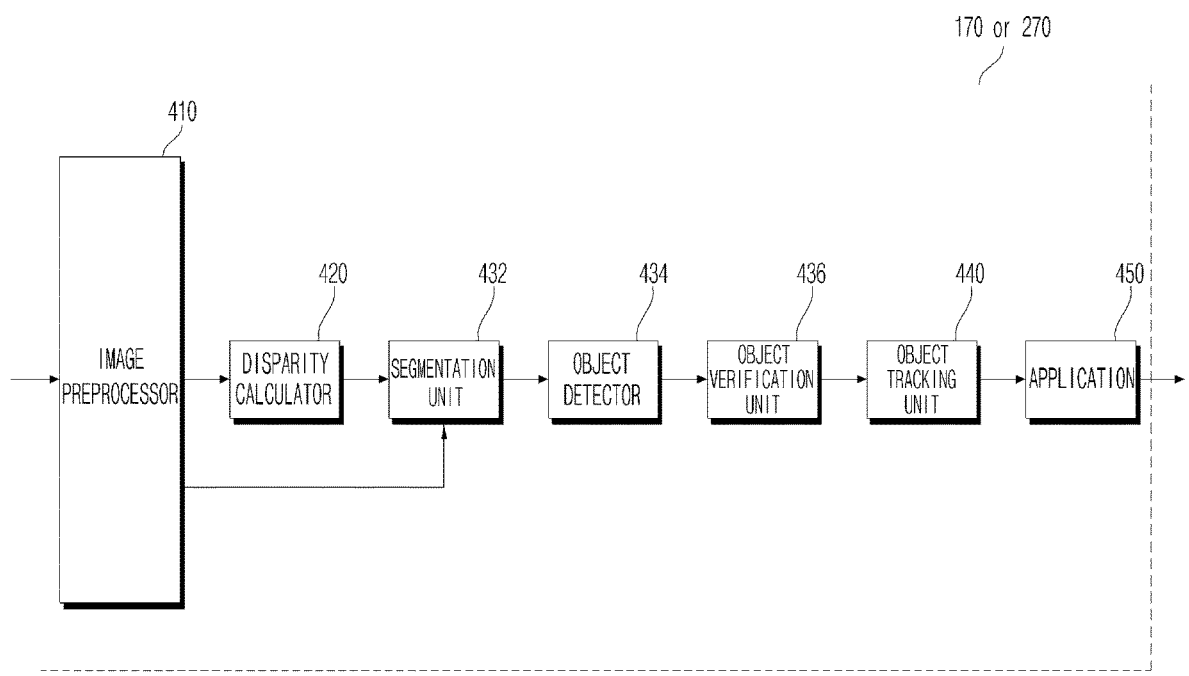
FIGS. 4A to 4B are block diagrams showing various examples of the internal configurations of the processors of FIGS. 3A to 3D.
Figure 4B:
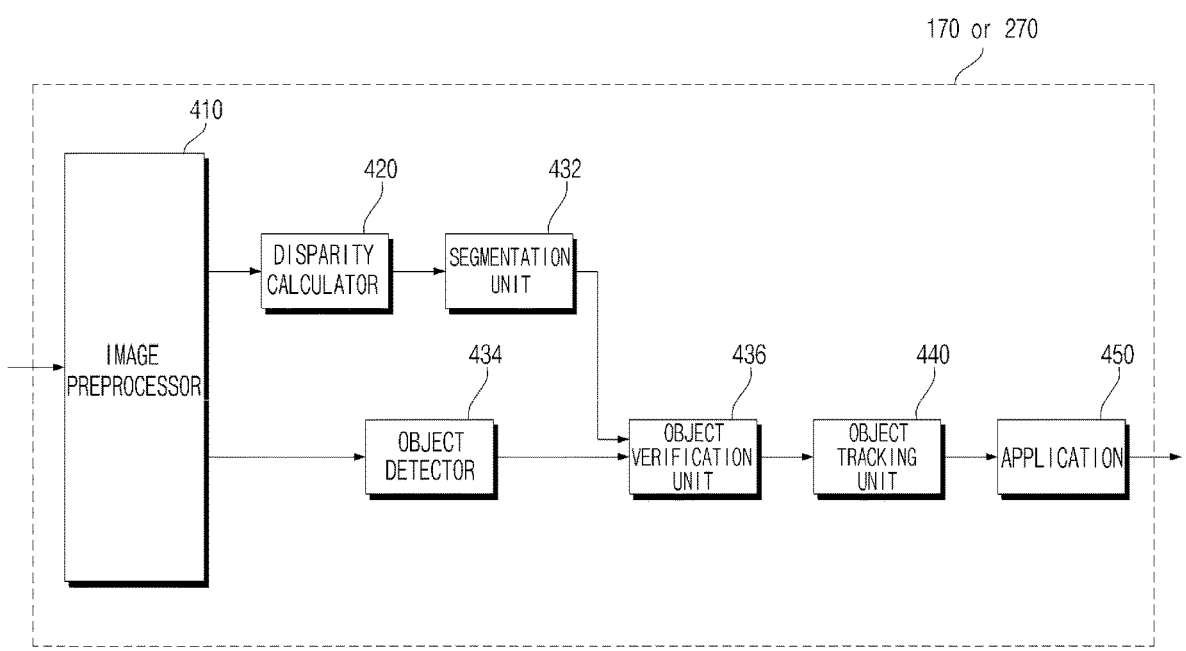

FIGS. 4*a* to 4*b* are block diagrams showing various examples of the internal configurations of the processors of FIGS. 3*a* to 3*d*, and FIG. 5 is a diagram showing object detection in the processors of FIGS. 4*a* to 4*b*.

First, referring to FIG. 4*a*, FIG. 4*a* is the block diagram showing the internal configuration of the processor 170 of the ADAS 100*a* of FIGS. 3*a* to 3*b* or the processor 270 of the around view monitoring apparatus 100*b* of FIGS. 3*c* to 3*d*.

The processor 170 or 270 may include an image preprocessor 410, a disparity calculator 420, an object detector 434, an object tracking unit 440 and an application 450.

The image preprocessor 410 receives the plurality of images from the plurality of cameras 295*a*, . . . , 295*d* or the generated around view image and performs preprocessing.

More specifically, the image preprocessor 410 may perform noise reduction, rectification, calibration, color enhancement, color space conversion (CSC), interpolation, camera gain control, etc. with respect to the plurality of images or the generated around view image. Therefore, it is possible to acquire images having higher definition than that of the images captured by the plurality of cameras 295*a*, . . . , 295*d* or the generated around view image.

The disparity calculator 420 receives the plurality of images or the generated around view image processed by the image preprocessor 410, performs stereo matching with respect to the plurality of images sequentially received during a predetermined time or the generated around view image, and acquires a disparity map according to stereo matching. That is, it is possible to acquire disparity information of the periphery of the vehicle.

At this time, stereo matching may be performed in pixel units of the stereo images or predetermined block units. The disparity map may mean a map numerically expressing the binocular parallax information of the images, that is, left and right images.

A segmentation unit 432 may perform segmentation and clustering with respect to the images based on the disparity information from the disparity calculator 420.

More specifically, the segmentation unit 432 may segment a background and a foreground with respect to at least one of the images based on the disparity information.

For example, a region having disparity information of a predetermined value or less in the disparity map may be calculated as the background and be excluded. Therefore, the foreground may be segmented.

As another example, a region having disparity information of a predetermined value or more in the disparity map may be calculated as the foreground and be extracted. Therefore, the background may be segmented.

The foreground and the background may be segmented based on the disparity information extracted based on the images, thereby reducing a signal processing speed, the amount of processed signals, etc. upon subsequent object detection.

Next, the object detector 434 may detect an object based on image segmentation of the segmentation unit 432.

That is, the object detector 434 may detect an object from at least one of the images based on the disparity information.

More specifically, the object detector 434 may detect the object from at least one of the images. For example, the object may be detected from the foreground segmented by segmentation.

Next, an object verification unit 436 classifies and verifies the segmented objects.

To this end, the object verification unit 436 may use an identification method using a neural network, a support vector machine (SVM) method, an AdaBoost identification method using Haar-like features or a histograms-of-oriented-gradients (HOG) method, etc.

The object verification unit 436 may compare the detected object with the objects stored in the memory 240 to verify the object.

For example, the object verification unit 436 may verify a peripheral vehicle, a lane, a road surface, a traffic sign, a dangerous zone, a tunnel, etc. located in the vicinity of the vehicle.

The object tracking unit 440 tracks the verified object. For example, objects in the sequentially acquired images may be verified, motion or motion vectors of the verified objects may be calculated and movement of the objects may be tracked based on the calculated motion or motion vectors. Therefore, it is possible to track the peripheral vehicle, the lane, the road surface, the traffic sign, the dangerous zone, the tunnel, etc. located in the vicinity of the vehicle.

FIG. 4*b* is a block diagram showing another example of the internal configuration of the processor.

Referring to the figure, the processor 170 or 270 of FIG. 4*b* is equal to the processor 170 or 270 of FIG. 4*a* except for a signal processing order. Hereinafter, only the difference will be described.

The object detector 434 may receive the plurality of images or the generated around view image and detect the object from the plurality of images or the generated around view image. Unlike FIG. 4*a*, the object may not be detected from the segmented image but may be directly detected from the plurality of images or the generated around view image based on the disparity information.

Next, the object verification unit 436 classifies and verifies the segmented and detected object based on the image segment from the segmentation unit 432 and the object detected by the object detector 434.

To this end, the object verification unit 436 may use an identification method using a neural network, a support vector machine (SVM) method, an AdaBoost identification method using Haar-like features or a histograms-of-oriented-gradients (HOG) method, etc.

Figure 5A:
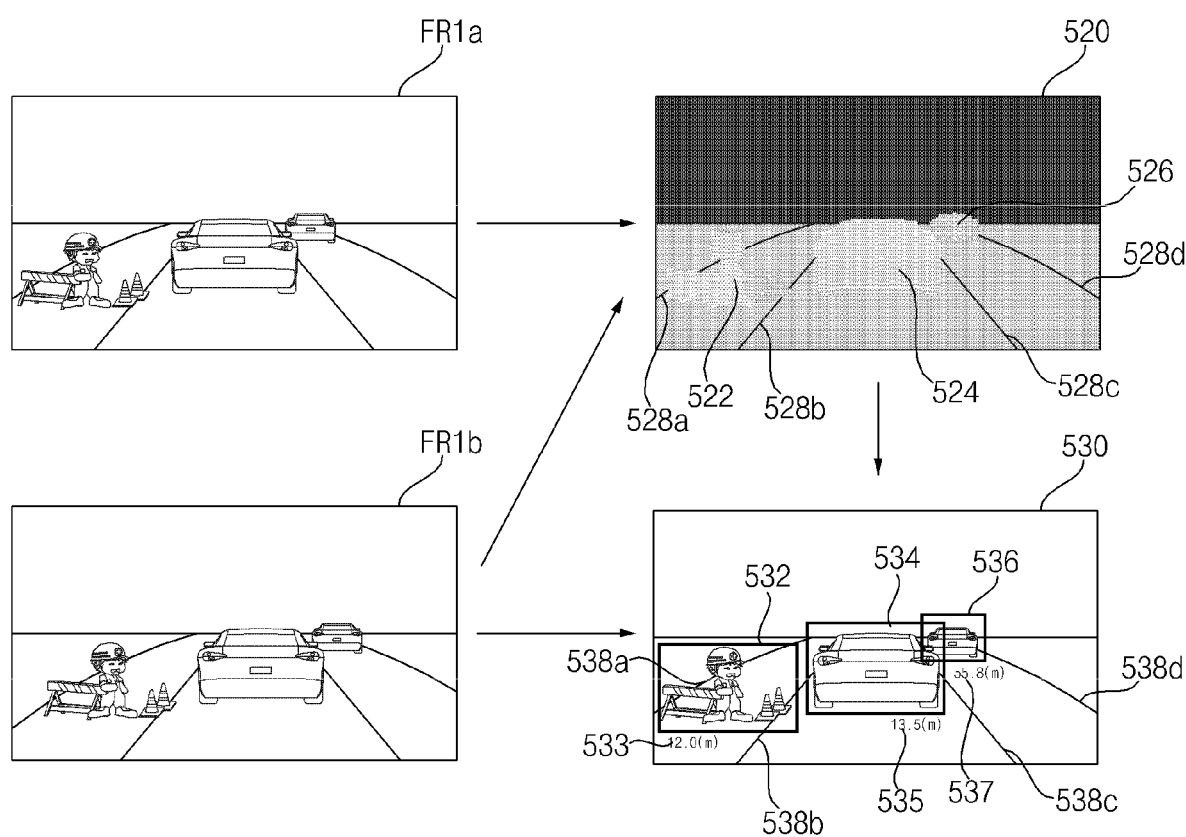
FIGS. 5A to 5B are diagrams showing object detection in the processors of FIGS. 4A to 4B.
Figure 5B:
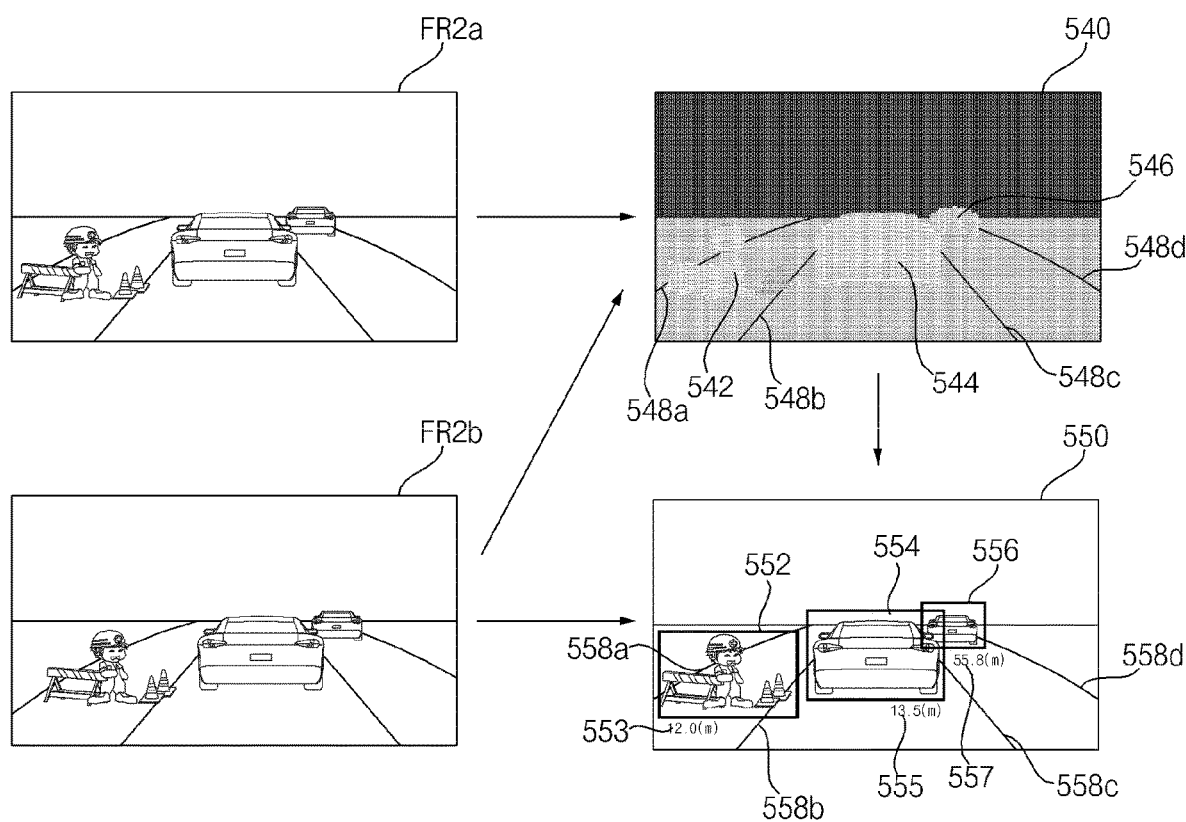

FIG. 5 is a diagram referenced to describe a method of operating the processor 170 or 270 of FIGS. 4*a* to 4*b* based on images respectively acquired in first and second frame periods.

Referring to FIG. 5, the plurality of cameras 295*a*, . . . , 295*d* sequentially acquires images FR1*a* and FR1*b* during the first and second frame periods.

The disparity calculator 420 of the processor 170 or 270 receives the images FR1*a* and FR1*b* processed by the image preprocessor 410, performs stereo matching with respect to the images FR1*a* and FR1*b*, and acquires a disparity map 520.

The disparity map 520 expresses the binocular parallax level between the stereo images FR1*a* and FR1*b*. As a disparity level increases, a distance from a vehicle decreases and, as the disparity level decreases, the distance from the vehicle increases.

When such a disparity map is displayed, as the disparity level increases, luminance increases and, as the disparity level decreases, luminance decreases.

In the figure, the disparity map 520 has disparity levels respectively corresponding to first to fourth lines 528*a*, 528*b*, 528*c* and 528*d*, for example, disparity levels respectively corresponding to a construction area 522, a first foregoing vehicle 524 and a second foregoing vehicle 526.

The segmentation unit 432, the object detector 434 and the object verification unit 436 may perform segmentation, object detection and object verification with respect to at least one of the images FR1a and FR1b based on the disparity map 520.

In the figure, object detection and verification are performed with respect to the second image FR1b using the disparity map 520.

That is, the first to fourth lines 538a, 538b, 538c and 538d, the construction area 532, the first foregoing vehicle 534 and the second foregoing vehicle 536 are detected and verified from the image 530 as objects.

The object tracking unit 440 may track the verified objects by continuously acquiring the images.

Figure 6A:
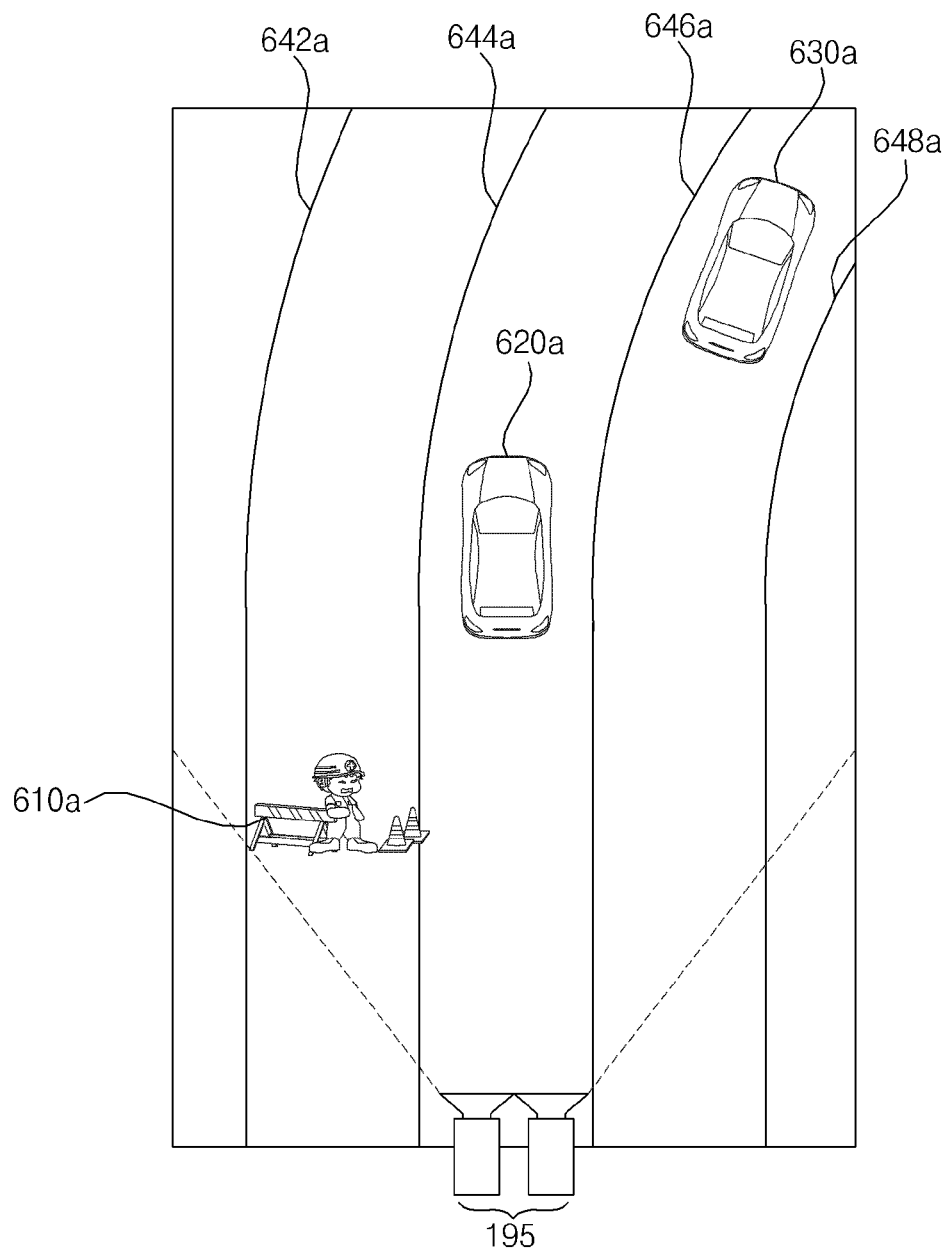
FIGS. 6A to 6B are views referenced to describe operation of the autonomous driving apparatus of FIG. 1.
Figure 6B:
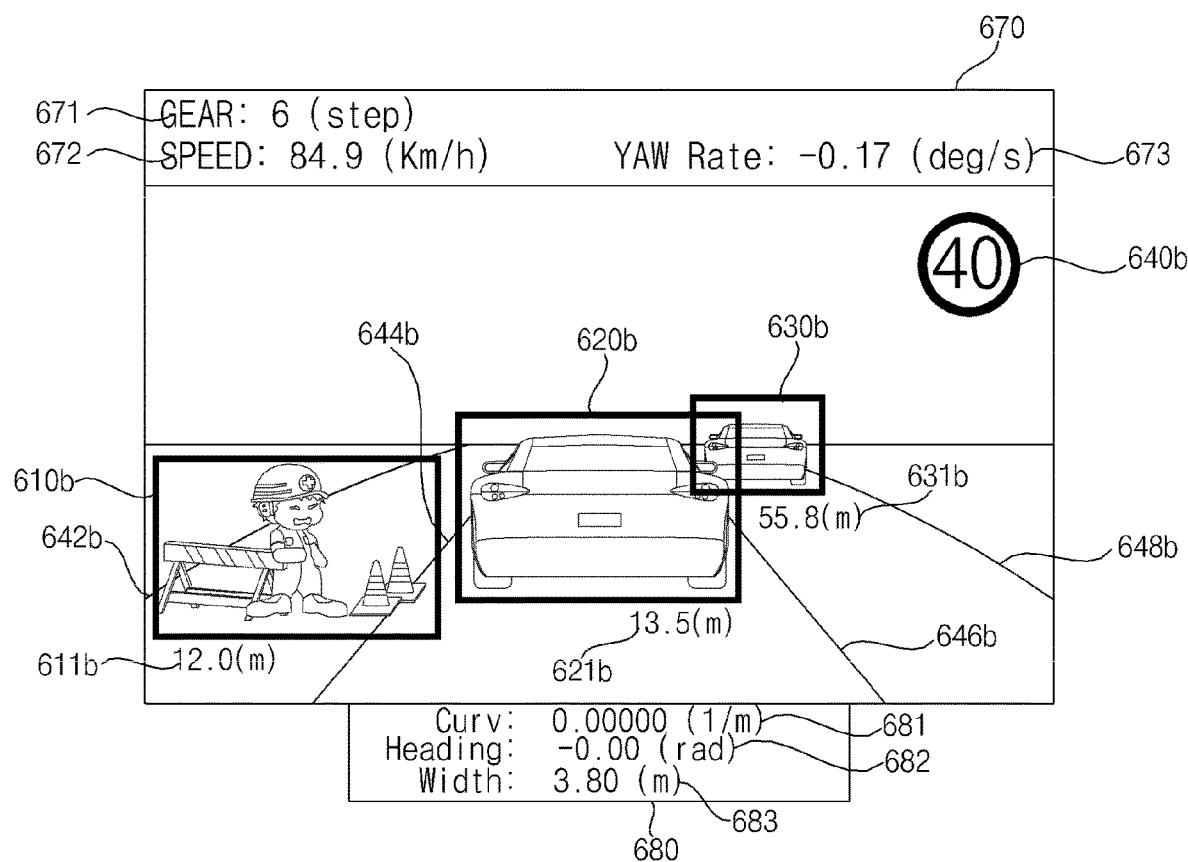

FIGS. 6a to 6b are views referenced to describe operation of the autonomous driving apparatus of FIG. 1.

First, FIG. 6a shows the situation of the front side of a vehicle captured by the stereo camera 195 provided inside the vehicle. In particular, the situation of the front side of the vehicle is displayed in a bird's eye view.

Referring to the figure, it can be seen that a first line 642a, a second line 644a, a third line 646a and a fourth line 648a are located from left to right, a construction zone 610a is located between the first line 642a and the second line 644a, a first foregoing vehicle 620a is located between the second line 644a and the third line 646a, and a second foregoing vehicle 630a is located between the third line 646a and the fourth line 648a.

Next, FIG. 6b is a diagram showing the case where the situation of the front side of the vehicle checked by the ADAS is displayed along with a variety of information. In particular, the image shown in FIG. 6b may be displayed on the display 180 provided by the ADAS or the vehicle display apparatus 400.

FIG. 6b shows the case where information is displayed based on the image captured by the stereo camera 195, unlike FIG. 6a.

Referring to the figure, it can be seen that a first line 642b, a second line 644b, a third line 646b and a fourth line 648b are located from left to right, a construction zone 610b is located between the first line 642b and the second line 644b, a first foregoing vehicle 620b is located between the second line 644b and the third line 646b, and a second foregoing vehicle 630b is located between the third line 646b and the fourth line 648b.

The ADAS 100a performs signal processing based on the stereo image captured by the stereo camera 195 and verify the objects such as the construction zone 610b, the first foregoing vehicle 620b and the second foregoing vehicle 630b. In addition, the first line 642b, the second line 644b, the third line 646b and the fourth line 648b may be verified.

Meanwhile, in the figure, in order to verify the objects such as the construction zone 610b, the first foregoing vehicle 620b and the second foregoing vehicle 630b, the construction zone 610b, the first foregoing vehicle 620b and the second foregoing vehicle 630b are framed.

The ADAS 100a may calculate distance information of the construction zone 610b, the first foregoing vehicle 620b and the second foregoing vehicle 630b based on the stereo image captured by the stereo camera 195.

In the figure, first distance information 611b, second distance information 621b and third distance information 631b respectively corresponding to the construction zone 610b, the first foregoing vehicle 620b and the second foregoing vehicle 630b are shown.

The ADAS 100a may receive sensor information of the vehicle from the ECU 770 or the sensor unit 760. In particular, vehicle speed information, gear information, yaw rate information indicating the rate of the rotation angle (yaw angle) of the vehicle, and vehicle angle information may be received and displayed.

Although, in the figure, the vehicle speed information 672, the gear information 671 and the yaw rate information 673 are displayed at the upper side 670 of the front image of the vehicle and the vehicle angle information 682 is displayed at the lower side 680 of the front image of the vehicle, various examples are possible. In addition, vehicle width information 683, road curvature information 681, and vehicle angle information 682 may also be displayed.

The ADAS 100a may receive speed limit information of the road on which the vehicle travels, through the communication unit 120 or the interface 130. In the figure, the speed limit information 640b is shown.

The ADAS 100a may display a variety of information shown in FIG. 6b on the display 180 or may store a variety of information without display. Such information may be used for various applications.

Figure 7:
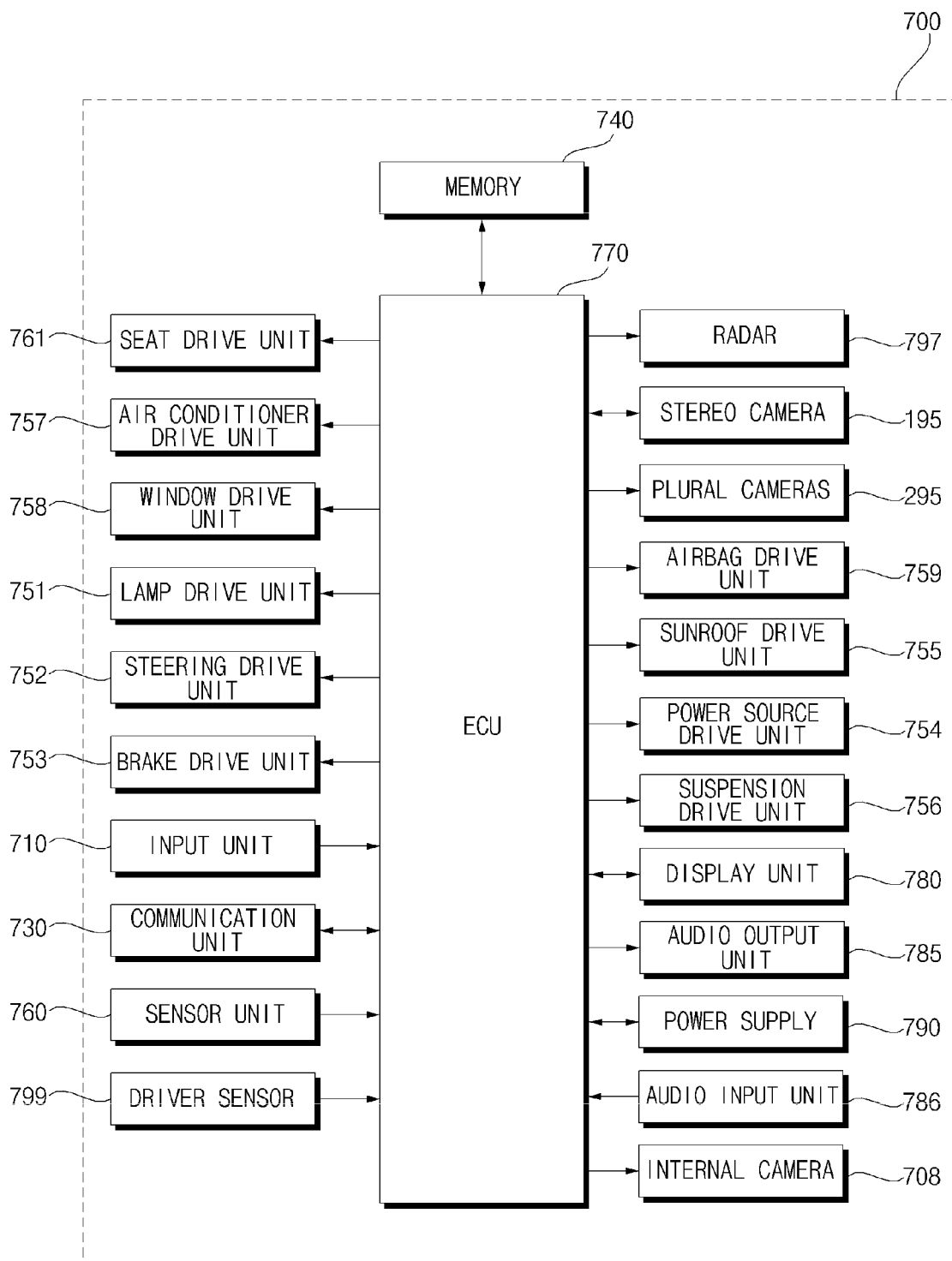
FIG. 7 is a block diagram showing an example of the internal configuration of a vehicle according to an embodiment of the present invention.

FIG. 7 is a block diagram showing an example of the internal configuration of a vehicle according to an embodiment of the present invention.

Referring to the figure, the vehicle 200 may include an electronic control apparatus 700 for vehicle control.

The electronic control apparatus 700 may include an input unit 710, a communication unit 720, a memory 740, a lamp drive unit 751, a steering drive unit 752, a brake drive unit 753, a power source drive unit 754, a sunroof drive unit, a suspension drive unit 756, an air conditioner drive unit 757, a window drive unit 758, an airbag drive unit 759, a sensor unit 760, an ECU 770, a display 780, an audio output unit 785, an audio input unit 786, a power supply 790, a stereo camera 195, a plurality of cameras 295, a radar 797, an internal camera 708, a seat drive unit 761, and a driver sensor 799.

The ECU 770 may include the processor 270 described with reference to FIG. 3c or 3d. Alternatively, in addition to the ECU 770, a processor for processing the images from the cameras may be further included.

The input unit 710 may include a plurality of buttons or a touchscreen provided inside the vehicle 200. Through the plurality of buttons or the touchscreen, a variety of input operations may be performed.

The communication unit 720 may exchange data with the mobile terminal 600 or the server 500 in a wireless manner. In particular, the communication unit 720 may exchange data with a mobile terminal of a vehicle driver in a wireless manner. A wireless data communication method includes various data communication methods such as Bluetooth, Wi-Fi Direct, Wi-Fi, APiX, etc.

For example, the communication unit 720 may receive a schedule of a driver, schedule information related to a movement position, weather information and road traffic state information, e.g., Transport Protocol Experts Group (TPEG) information, from the mobile terminal 600 or the server 500.

When a user gets into the vehicle, the mobile terminal 600 of the user and the electronic control apparatus 700 may pair with each other automatically or as the user executes an application.

The memory 740 may store a variety of data for overall operation of the electronic control apparatus 700, such as a program for processing or control of the ECU 770.

The memory 740 may store map information related to vehicle driving.

The lamp drive unit 751 may turn lamps arranged inside and outside the vehicle on or off. In addition, the lamp drive unit may control, for example, the intensity and direction of light of each lamp. For example, the lamp drive unit may perform control of a turn signal lamp or a brake lamp.

The steering drive unit 752 may perform electronic control of a steering apparatus inside the vehicle 200. The steering drive unit may change the direction of travel of the vehicle.

The brake drive unit 753 may perform electronic control of a brake apparatus (not illustrated) inside the vehicle 200. For example, the brake drive unit may reduce the speed of the vehicle 200 by controlling the operation of brakes located at wheels. In another example, the brake drive unit may adjust the direction of travel of the vehicle 200 leftward or rightward by differentiating the operation of respective brakes located at left and right wheels.

The power source drive unit 754 may perform electronic control of a power source inside the vehicle 200.

For example, in the case where a fossil fuel based engine (not illustrated) is a power source, the power source drive unit 754 may perform electronic control of the engine. Therefore, it is possible to control output torque of the engine.

In another example, in the case where an electric motor (not illustrated) is a power source, the power source drive unit 754 may perform control of the motor. As such, the power source drive unit may control, for example, the RPM and torque of the motor.

The sunroof drive unit 755 may perform electronic control of a sunroof apparatus (not illustrated) inside the vehicle 200. For example, the sunroof drive unit may control opening or closing of a sunroof.

The suspension drive unit 756 may perform electronic control of a suspension apparatus inside the vehicle 200. For example, when a road surface is uneven, the suspension drive unit may control the suspension apparatus to reduce vibration of the vehicle 200.

The air conditioner drive unit 757 may perform electronic control of an air conditioner (not illustrated) inside the vehicle 200. For example, when the interior temperature of the vehicle 200 is high, the air conditioner drive unit may operate the air conditioner to supply cold air to the interior of the vehicle 200.

The window drive unit 758 may perform electronic control of a window apparatus inside the vehicle 200. For example, the window drive unit may control opening or closing of left and right windows of the vehicle 200.

The airbag drive unit 759 may perform electronic control of an airbag apparatus inside the vehicle 200. For example, the airbag drive unit may control an airbag to be deployed in a dangerous situation.

The seat drive unit 761 may control the position of the seat or seatback of the vehicle 200. For example, when a driver sits in a driver's seat, the position of the driver's seat or seatback may be controlled back and forth to suit the driver.

The seat drive unit 761 may drive rollers provided in the seat or seatback to provide pressure of a massager to the driver.

The sensing unit 760 is to sense signals associated with traveling of the vehicle 100. To this end, the sensing unit 760 may include a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, etc.

As such, the sensing unit 760 may acquire sensing signals with regard to, for example, vehicle traveling direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The ECU 770 may control overall operation of the units of the electronic control apparatus 700.

The ECU may perform specific operation based on input received through the input unit 710 or receive and transmit the signal sensed by the sensor unit 760 to the around view monitoring apparatus 100b, receive map information from the memory 740 and control operations of the drive units 751, 752, 753, 754 and 756.

In addition, the ECU 770 may receive weather information and road traffic situation information, e.g., Transport Protocol Experts Group (TPEG) information, from the communication unit 720.

The ECU 770 may synthesize a plurality of images received from the plurality of cameras 295 to generate an around view image. In particular, when the speed of the vehicle is equal to or less than a predetermined speed or when the vehicle is reversed, the around view image may be generated.

The display 780 may display the image of the front side of the vehicle while the vehicle travels or the around view image when the vehicle is slowly driven. In particular, various user interfaces may be provided in addition to the around view image.

For display of the around view image, the display 780 may include a cluster or a head up display (HUD) located at the internal front side of the vehicle. When the display 780 is a HUD, a projection module for projecting an image onto the windshield of the vehicle 200 may be included. The display 780 may include a touchscreen capable of performing an input function.

The audio output unit 785 outputs sound corresponding to the input unit 710, that is, the button.

The audio input unit 786 may receive user voice. The audio input unit may include a microphone. The received voice may be converted into an electrical signal and delivered to the ECU 770.

The power supply 790 may supply power required to operate the respective components under control of the ECU 770. In particular, the power supply 790 may receive power from, for example, a battery (not illustrated) inside the vehicle.

The stereo camera 195 is used for operation of the ADAS. This has been described above and thus a description thereof will be omitted.

The plurality of cameras 295 is used to provide the around view image and may include four cameras as shown in FIG. 2c. For example, the plurality of around view cameras 295a, 295b, 295c and 295d may be disposed at the left, rear, right and front sides of the vehicle. The plurality of images captured by the plurality of cameras 295 may be delivered to the ECU 770 or the processor (not shown).

The internal camera 708 captures an image of the interior of the vehicle including the driver. For example, the internal camera may include an RGB camera, an IR camera for heat detection, etc.

The driver sensor 799 senses the body information of the driver. For example, the driver sensor may sense the blood pressure, sleep, etc. of the driver.

The radar 797 transmits a transmission signal and receives a reception signal reflected from an object near the vehicle. Distance information may be output based on a difference between the transmission signal and the reception signal. In addition, phase information may also be output.

FIG. 8 is a diagram showing an autonomous vehicle system according to an embodiment of the present invention.

Referring to the figure, the autonomous vehicle system 20 may include a vehicle 200, an advertisement provider server 810, a service provider server 820, an advertiser terminal 830 and a passenger terminal 800.

The passenger terminal 800 may be a mobile terminal, such as a cellular phone, a smartphone, a smart watch, or a wearable device of a passenger.

The vehicle 200 in the autonomous vehicle system 20 of the present invention may receive advertisement information from the advertisement provider server 810 (S15), and output the received advertisement information through at least one of the display or the audio output unit.

The driver or the passenger may view advertisement information through at least one of the display or the audio output unit (S19).

The vehicle 200 or the passenger terminal 800 may acquire advertisement output time information, advertisement viewing time information of the passenger in the vehicle or viewing response information of the passenger in the vehicle upon advertisement output and transmit the acquired advertisement output time information, viewing time information or viewing response information to the advertisement provider server 810.

The advertisement provider server 810 may receive cost information from the advertiser terminal 830 (S14) and provide advertisement information to the vehicle 200 (S15).

The advertisement provider server 810 may provide service fee payment information of a service to be used in the vehicle 200 or by the passenger to the service provider server 820 (S11).

In particular, the advertisement provider server 810 may provide service fee payment information changed according to vehicle or passenger, based on the advertisement output time information, the advertisement viewing time information of the passenger in the vehicle or the viewing response information of the passenger in the vehicle upon advertisement output.

The advertisement provider server 810 may accumulate points or credit miles in the passenger terminal 800 based on the advertisement viewing time information of the passenger in the vehicle or the viewing response information of the passenger in the vehicle upon advertisement output, and provide point accumulation information and mile credit information (S18).

The service provider server 820 may provide a content provision service, a refueling service, a charging service, a parking service, a car sharing service, a taxi service or a toll service to the vehicle 200, the passenger or the passenger terminal 800 (S12 and S16).

The service provider server 820 may receive the service fee payment information changed according to vehicle or passenger from the advertisement provider server 810 and provide a car sharing service and a taxi service for the vehicle 200. Alternatively, the content provision service, a refueling service, a charging service or a parking service may be provided to the passenger or the passenger terminal 800.

The terminal 800 of the passenger may access the advertiser terminal 830 online based on the service information received from the service provider server 820 and provide purchase information (S13).

The passenger may visit a store managed by an advertiser offline based on service information provided through the terminal 800 of the passenger, and directly purchase related products.

The vehicle 200 may move to the vicinity of the store managed by the advertiser (S17) and receive advertisement information from the advertiser terminal 830 or the advertisement provider server 810 upon approaching the store within a predetermined distance.

The advertiser terminal 830 may receive the advertisement output time information, the viewing time information of the passenger or the viewing response information of the passenger from the passenger terminal 800 or the vehicle 200 and provide promotion information corresponding to the received information to the passenger terminal 800 or the vehicle 200.

Alternatively, the advertisement provider server 810 may receive advertisement output time information, advertisement viewing time information of the passenger in the vehicle or viewing response information of the passenger in the vehicle upon advertisement output from the passenger terminal 800 or the vehicle 200 and provide promotion information corresponding to the received information to the passenger terminal 800 or the vehicle 200.

By this method, the vehicle 200 may move to the vicinity of the store managed by the advertiser upon traveling (S17) and receive advertisement information from the advertiser terminal 830 or the advertisement provider server 810 upon approaching the store within a predetermined distance to enable the passenger to view the advertisement, such that a service necessary for the vehicle 200 or the passenger is received from the service provider server 820 free or at a discounted price.

That is, the vehicle 200 or the passenger may view advertisements instead of paying a service fee.

The service provider may receive cost from the advertisement provider and the advertisement provider may receive cost from the advertiser. The advertiser may receive cost from the vehicle 200 or the passenger thereof who purchases goods online/offline.

The vehicle 200 will be described in greater detail. The processor 170 or 270 of the vehicle 20 according to the embodiment of the present invention may select one of a plurality of routes to a destination in an autonomous mode, perform control to be autonomously driven along the selected route, receive advertisement information from the outside while traveling along the selected route, and perform control to output the received advertisement information through at least one of the display or the audio output unit. At this time, the received advertisement information may be changed according to the plurality of routes.

Meanwhile, the processor 170 or 770 may perform control to selectively output some of the received advertisement information based on information on the driver or passenger in the vehicle or vehicle information.

The processor 170 or 770 may perform control to transmit advertisement output time information, advertisement viewing time information of the passenger in the vehicle or viewing response information of the passenger in the vehicle upon advertisement output to an external device.

According to the advertisement output time information, advertisement viewing time information of the passenger or viewing response information of the passenger, cost required to travel to the destination or the parking fee after arriving at the destination may be changed.

The processor 170 or 770 may select a destination and one of a plurality of routes according to input of the driver or the passenger.

The processor 170 or 770 may set a destination according to input of the driver or the passenger and select one of the plurality of routes according to driver information or passenger information.

The processor 170 or 770 may perform control to output information indicating whether to move to a position related to the advertisement information through at least one of the display or the audio output unit, after outputting the advertisement information.

The received advertisement information may be changed according to vehicle speed or road conditions.

The processor 170 or 770 may change the advertisement information output through the display or the audio output unit among the received advertisement information according to vehicle speed or road conditions.

The processor 170 or 770 may receive advertisement information from the outside upon traveling along the selected route, and perform control to output the received advertisement information through at least one of the display or the audio output unit at a first point and to end advertisement output at a second point.

The advertisement information may be received from the transmission apparatus of the store located near the road, on which the vehicle travels, or an adjacent vehicle.

When driver voice is input through the audio input unit 786, the processor 170 or 770 may recognize driver voice and extract destination information on the recognized driver voice.

The communication unit 730 may receive schedule information of the driver from the mobile terminal of the driver and the processor 170 or 770 may extract destination information based on the schedule information.

The processor 170 or 770 may calculate the viewing time information of the passenger or the viewing response information of the passenger based on the image from the internal camera 708 and the driver body information from the driver sensor 799.

When information indicating that a vehicle accident occurs ahead is received or when a difference between an estimated time of arrival and a target time is equal to or greater than a predetermined value, the processor 170 or 770 may search for a detour route based on at least one of a road type, a speed limit, a current speed, curvature of a road, a crossroads, traffic and presence/absence of a construction zone, select any one of the searched detour routes, change the route, and enable the vehicle to autonomously travel along the changed route.

The processor 170 or 770 may control at least one of the steering drive unit, the brake drive unit or the power supply drive unit when the vehicle autonomously travels, based on the images from the plurality of cameras 195 or 295 and the distance information of the object located near the vehicle, which is received from the radar.

The vehicle 200 according to another embodiment of the present invention may select one of a plurality of routes to a destination based on a selected advertisement information when any one of a plurality of pieces of advertisement information received through the communication unit is selected in an autonomous mode, and autonomously travel along the selected route. Therefore, it is possible to provide a route changed according to advertisement information.

To this end, when any one of a plurality of pieces of advertisement information received through the communication unit is selected in an autonomous mode, the processor 170 or 770 may select any one of a plurality of routes to a destination and control the vehicle to autonomously travel along the selected route.

The processor 170 or 770 may perform control to output the selected advertisement information through at least one of the display or the audio output unit.

FIGS. 9a to 14h are views referenced to describe a method of operating the autonomous vehicle of FIG. 8.

When a driver says "autonomous mode", the processor 170 or 770 may perform voice recognition through a voice recognition algorithm and perform control to enter the autonomous mode.

Thus, the vehicle 200 may enter the autonomous mode according to input of the driver or automatically.

As another example, if an autonomous mode button provided in the vehicle 200 is pressed, the processor 170 or 770 may perform control to enter the autonomous mode.

As another example, when the driver selects an "autonomous mode" item through the display apparatus 400 in the vehicle 200, the processor 170 or 770 may perform control to enter the autonomous mode.

Upon entering the autonomous mode, the processor 170 or 770 may control at least one of the steering drive unit 752, the brake drive unit 753 and the power supply drive unit 754 based on the images from the plurality of cameras 195 or 295 and distance information of the object located near the vehicle, which is received from the radar 797.

Specifically, the processor 170 or 770 may generate a disparity map of the front side of the vehicle based on the stereo image of the front side of the vehicle, which is received from the stereo camera 195, and detect and verify the object located at the front side of the vehicle, and calculate distances from the objects.

In addition, the processor 170 or 770 may acquire the distance information of the object located near the vehicle from the radar 797 capable of omnidirectionally outputting signals.

In addition, the processor 170 or 770 may control the power supply drive unit 754 to control the speed of the vehicle, control the brake drive unit 753 in order to maintain a predetermined distance from a foregoing vehicle, or control the steering drive unit 752 for lane change or rotation, based on the object located at the front side of the vehicle, which is detected and verified based on the stereo camera 195, and the distance thereof, and the distance information of the object located near the vehicle, which is acquired based on the radar 797.

The processor 170 or 770 may receive destination information and enable the vehicle to autonomously travel along any one of a plurality of routes to a destination based on the received destination information, in the autonomous mode.

Here, the destination information may be received using various methods.

Figure 9A:
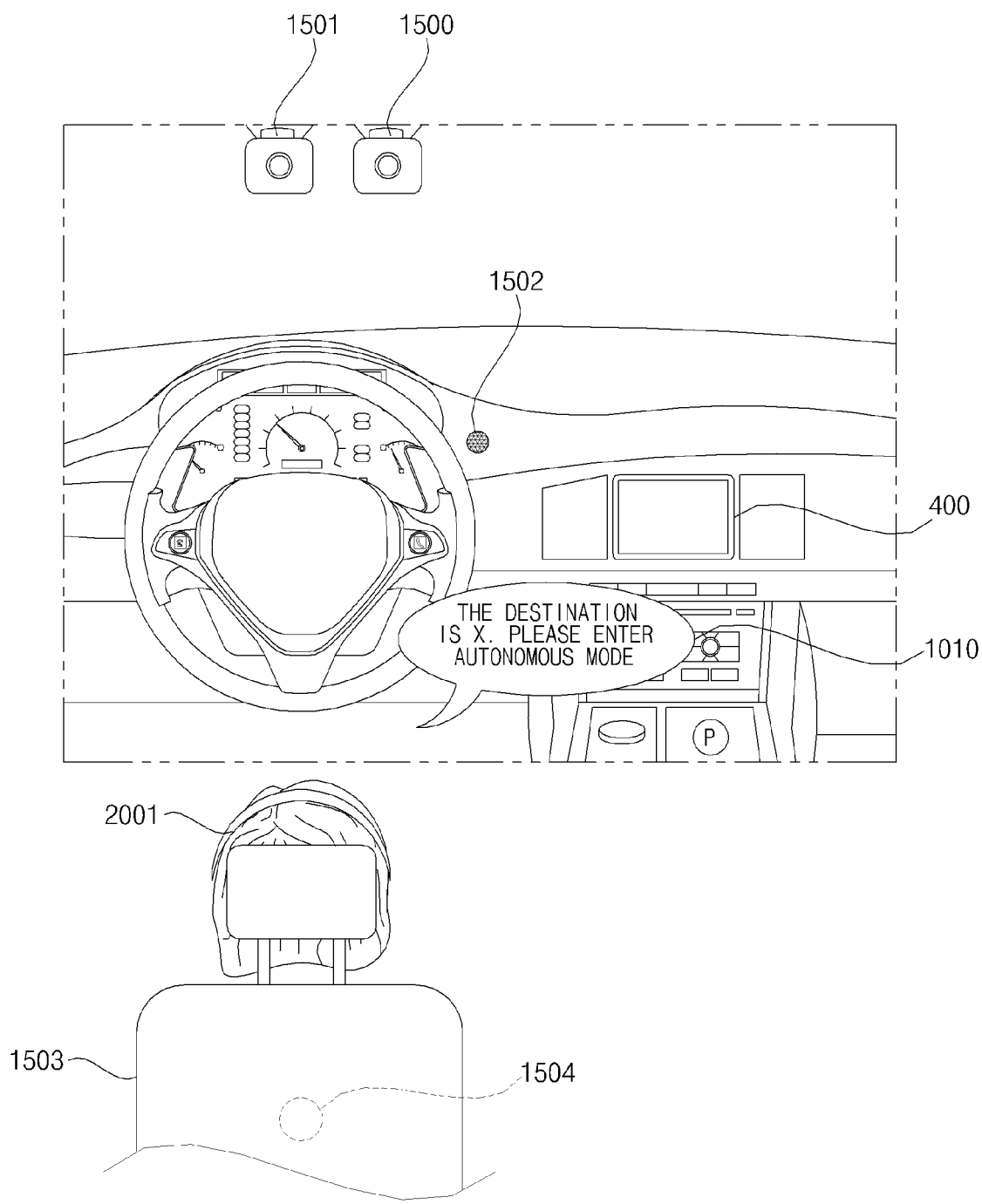
FIGS. 9A to 14H are views referenced to describe a method of operating the autonomous vehicle of FIG. 8.

For example, when driver voice 1010 including "destination information" is input through the audio input unit 786 as shown in FIG. 9a, the processor 170 or 770 may recognize the driver voice and extract the destination information based on the recognized driver voice.

FIG. 9a shows the case where the deriver outputs voice 1010 "The destination is x. Please enter autonomous mode."

Then, the processor 170 or 770 may recognize the driver voice 1010, extract the destination information X and the autonomous mode information from the driver voice 1010, and perform control such that the vehicle autonomously travels to a destination X.

Another example, when the schedule information of the driver is received from the mobile terminal 600 of the driver through the communication unit 730, the processor 170 or 770 may extract the destination information based on the schedule information.

Figure 9B:
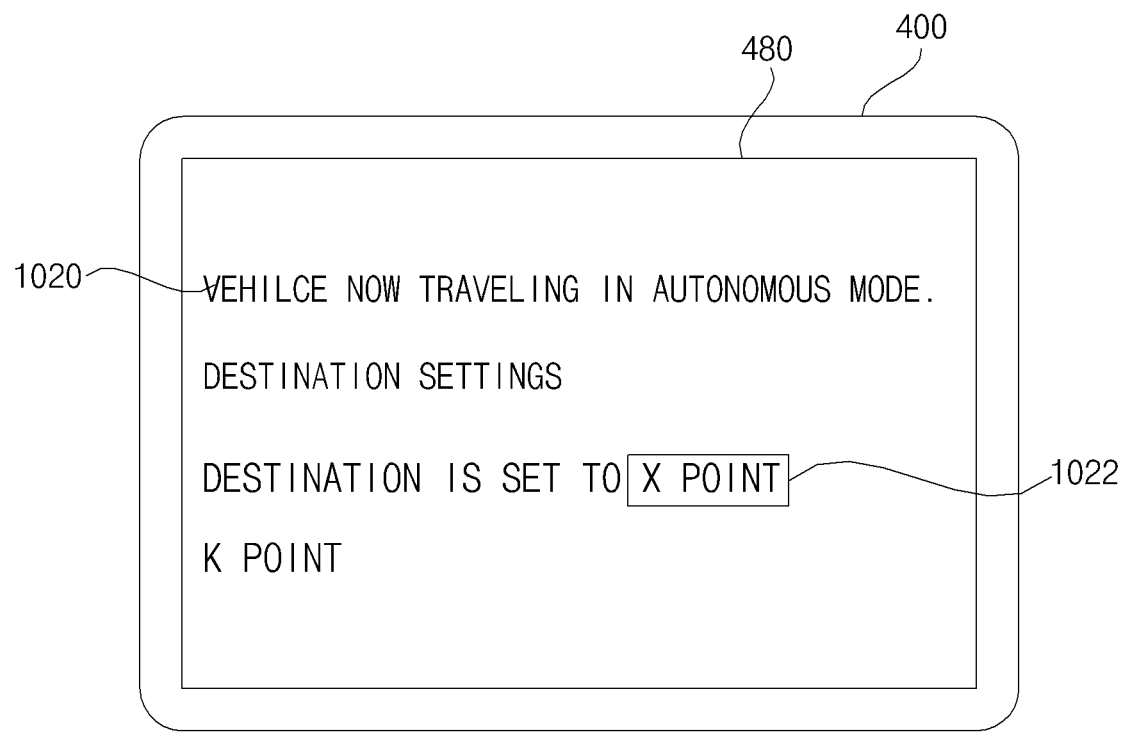

The processor 170 or 770 may perform control to display an autonomous mode indicator 1020 on the display 480 of the display apparatus 400 upon entering the autonomous mode, as shown in FIG. 9b.

The processor 170 or 770 may select any one destination item 1022 from among a plurality of destinations through user input, as shown in FIG. 9b.

Figure 9C:
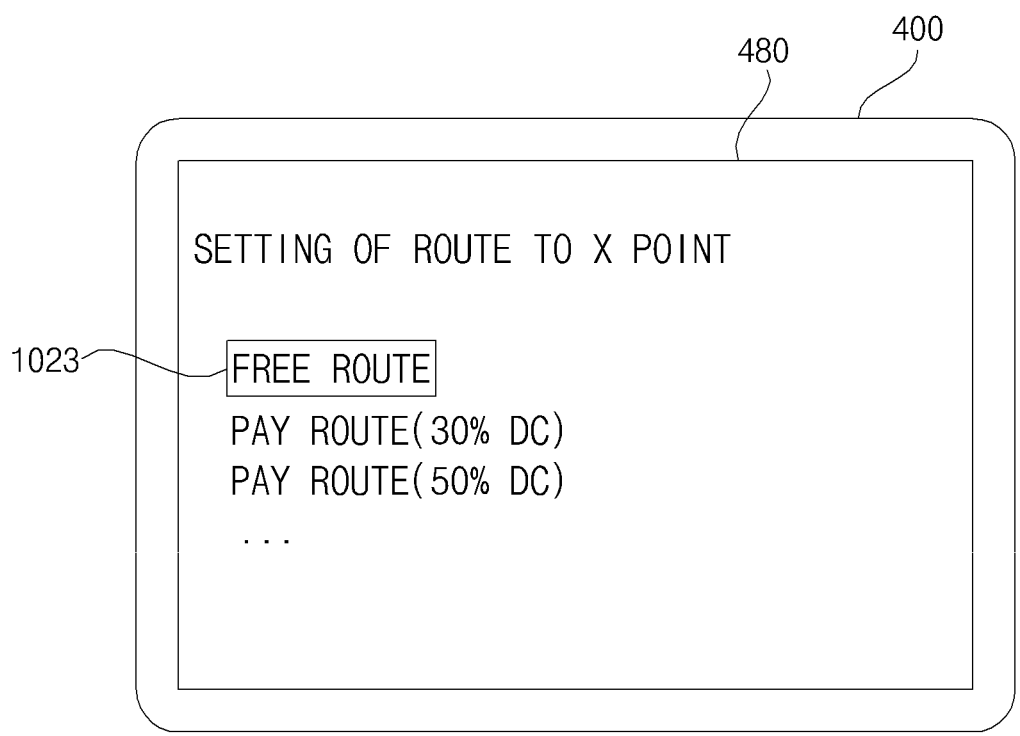

The processor 170 or 770 may provide a plurality of pieces of route information after setting the destination, as shown in FIG. 9c.

At this time, the processor 170 or 770 may provide a plurality of pieces of route information including a free route item 1023 and a pay route item as shown in FIG. 9c and select one of the plurality of routes corresponding to the free route item 1023 upon selecting the free route item 1023.

Figure 9D:
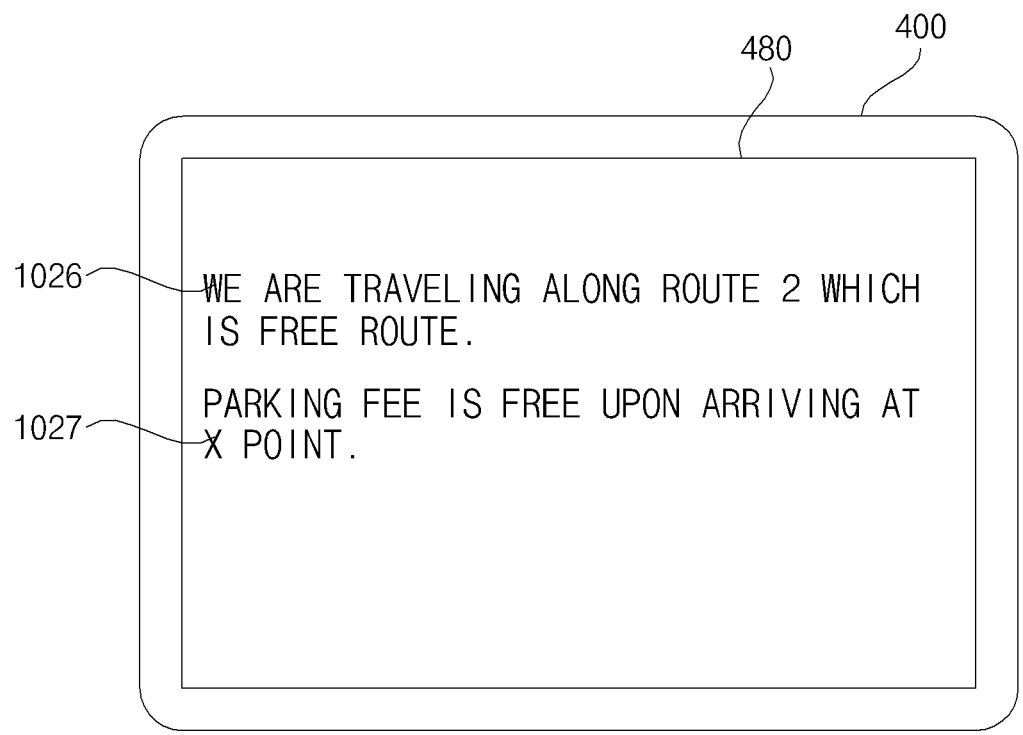

For example, the processor 170 or 770 may select a second route from among the plurality of routes corresponding to the free route as shown in FIG. 9d and provide selected second route information 1036 on the display 480.

The processor 170 or 770 may display information 1027 related to the destination, e.g., information on a parking fee, on the display 480.

The processor 170 or 770 may select a destination and one of a plurality of routes according to input of the driver or the passenger.

The processor 170 or 770 may set a destination according to input of the driver or the passenger and select one of the plurality of routes according to driver information or passenger information.

Figure 10:
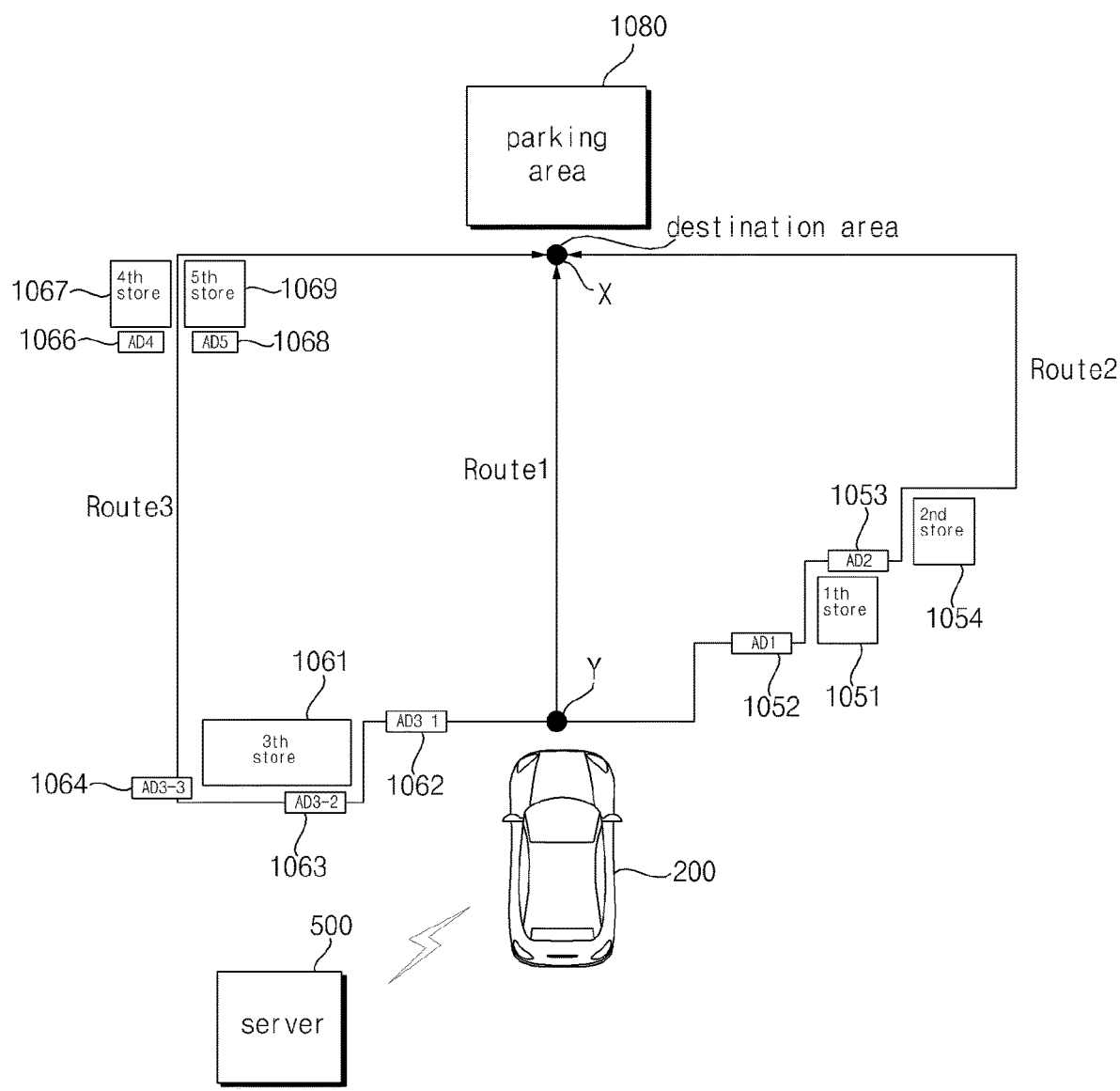

FIG. 10 is a diagram showing a plurality of routes along which the vehicle may travel.

When the current position of the vehicle is Y, the vehicle 200 may exchange data with an external server 500, and autonomously travel based on the data from the external server 500, the images from the plurality of cameras 195 or 295 and the distance information of the object located near the vehicle, which is received from the radar 797.

In particular, if the destination is set to X, the processor 170 or 770 may calculate Route 1 which is a shortest route and a pay route, Route 2 which is a longest route, and Route 3.

Route 1 is a shortest route, which may not provide advertisement information and thus may be a toll road.

Route 2 is a longest route which may provide a plurality of advertisement information. In the figure, a first advertisement 1052 and a second advertisement 1054 are provided near a first store 1051 and a second store 1054 on the route 2.

The first advertisement 1052 and the second advertisement 1054 may be transmitted from the advertisement provider server 810 described with reference to FIG. 8 or the servers of the first store 1051 and the second store 1054 to the vehicle 200.

For example, when the vehicle 200 arrives in the vicinity of the first store 1051 while autonomously traveling along Route 2, the communication unit 730 of the vehicle 200 may receive advertisement information of the first store 1051 from the server of the first store 1051, and the processor 170 or 770 of the vehicle 200 may perform control to output the received advertisement information of the first store 1051 through at least one of the display 780 or the audio output unit 785 for a predetermined time.

As another example, while the vehicle 200 autonomously travels along Route 2, the communication unit 730 of the vehicle 200 may frequently transmit the position information of the vehicle to the advertisement provider server 810. When the vehicle 200 arrives in the vicinity of the first store 1051, the advertisement provider server 810 may determine that the position information of the vehicle is the vicinity of the first store 1051 and transmit advertisement information of the first store 1051 to the vehicle 200.

Then, the communication unit 730 of the vehicle 200 may receive the advertisement information 1052 of the store 1051 from the advertisement provider server 810, and the processor 170 or 770 of the vehicle 200 may perform control to output the received advertisement information 1052 of the first store 1051 through at least one of the display 780 or the audio output unit 785 for a predetermined time.

When the vehicle 200 passes by the first store 1051 and arrives in the vicinity of the second store 1054 while autonomously traveling along Route 2, as described above, the communication unit 730 of the vehicle 200 may receive advertisement information 1054 of the second store 1053 from the advertisement provider server 810 or the server of the second store 1054. The processor 170 or 770 of the vehicle 200 may perform control to output the received advertisement information 1054 of the second store 1053 through at least one of the display 780 or the audio output unit 785 for a predetermined time.

When the vehicle 200 arrives at the destination X, the communication unit 730 of the vehicle 200 may transmit advertisement output time information, advertisement viewing time information of the passenger or viewing response information of the passenger to the advertisement provider server 810.

The advertisement provider server 810 may perform control to change cost required to travel to the destination or a parking fee after arriving at the destination according to advertisement output time information, advertisement viewing time information of the passenger or viewing response information of the passenger.

The communication unit 730 of the vehicle 200 may receive information on the vicinity of the destination from the advertisement provider server 810 based on advertisement output time information, advertisement viewing time information of the passenger or viewing response information of the passenger.

The information on the vicinity of the destination may include cost required to travel to the destination or information on a parking fee after arriving at the destination.

For example, the communication unit 730 of the vehicle 200 may receive cost required to travel to the destination or information on a parking fee after arriving at the destination.

Specifically, as advertisement output time information, advertisement viewing time information of the passenger or viewing response information of the passenger increases while the vehicle 200 travels, the cost required to travel to the destination or the parking fee after arriving at the destination may decrease.

Route 3 is shorter than Route 2, which may provide a plurality of pieces of advertisement information. In the figure, third advertisements 1062, 1063 and 1064, a fourth advertisement 1066 and a fifth advertisement 1068 are provided in the vicinities of a third store 1061, a fourth store 1067 and a fifth store 1069 on Route 3.

The third advertisements 1062, 1063 and 1064, the fourth advertisement 1066 and the fifth advertisement 1068 may be transmitted from the advertisement provider server 810 described with reference to FIG. 8 or the servers of the third store 1061, the fourth store 1067 and the fifth store 1069 to the vehicle 200.

Similarly to the above description, when the vehicle 200 arrives in the vicinity of the third store 1061 while autonomously traveling along Route 3, the communication unit 730 of the vehicle 200 may receive advertisement information 1062, 1063 and 1064 of the third store 1061 from the advertisement provider server 810 or the server of the third store 1061.

While the vehicle 200 passes, the advertisement information 1062, 1063 and 1064 of the third store 1061 may be received.

Alternatively, while the vehicle 200 passes, information 1062, 1063 and 1064 indicating that a discount rate is sequentially increased may be received in order to lead the vehicle 200 or the driver of the vehicle to visit the store.

The processor 170 or 770 may perform control to output the received advertisement information 1062, 1063 and 1064 of the third store 1061 through at least one of the display 780 or the audio output unit 785 at different times.

When the vehicle 200 arrives in the vicinity of the fourth store 1067 or the fifth store 1069 while autonomously traveling along Route 3, the communication unit 730 of the vehicle 200 may receive the advertisement information 1066 of the fourth store 1067 and the advertisement information 1068 of the fifth store 1069 from the advertisement provider server 810 or the server of the fourth store 1068 simultaneously or consecutively within a predetermined time.

When the advertisement information of different stores is received simultaneously or consecutively within a predetermined time, the processor 170 or 770 of the vehicle 200 may perform control to output first output advertisement information having highest priority among a plurality of store advertisements through at least one of the display 780 or the audio output unit 785 according to driver preference, passenger preference or the discount rate of the store.

The processor 170 or 770 of the vehicle 200 may perform control to sequentially output advertisement information of the other store according to priority.

For example, the advertisement information 1068 of the fifth store 1068 may be output first and then advertisement information 1066 of the fourth store 1067 may be output.

Alternatively, when the advertisement information of different stores is received simultaneously or consecutively within a predetermined time, the processor 170 or 770 of the vehicle 200 may perform control to output selected advertisement information through at least one of the display 780 or the audio output unit 785 according to user input.

For example, the advertisement information 1068 of the fifth store 1069 selected by the driver or the passenger may be output first.

The processor 170 or 770 may perform control to output route information (Route 1, Route 2 or Route 3) and information on a time required for each route on the display 480 of the display apparatus 400 upon arriving at the destination.

The processor 170 or 770 may receive destination change information from the external server 500 or the mobile terminal 600 of the driver.

In addition, the processor 170 or 770 may change the destination according to the destination change information and perform control such that the vehicle autonomously travels.

When information indicating that a vehicle accident occurs ahead is received as received route state information or when a difference between an estimated time of arrival and a target time is equal to or greater than a predetermined value, the processor 170 or 770 may search for a detour route based on at least one of a road type, a speed limit, a current speed, curvature of a road, a crossroads, traffic and presence/absence of a construction zone, select any one of the searched detour routes, change the route, and enable the vehicle to autonomously travel along the changed route.

FIGS. 11a to 12d show user interfaces displayable on the display 180 when the vehicle travels along Route 2 of FIG. 10.

The communication unit 730 of the vehicle 200 may receive advertisement information of a store located at any point on a specific route from the advertisement provider server 810, regardless of approaching the vicinity of the specific store while the vehicle travels along a specific route.

Figure 11A:
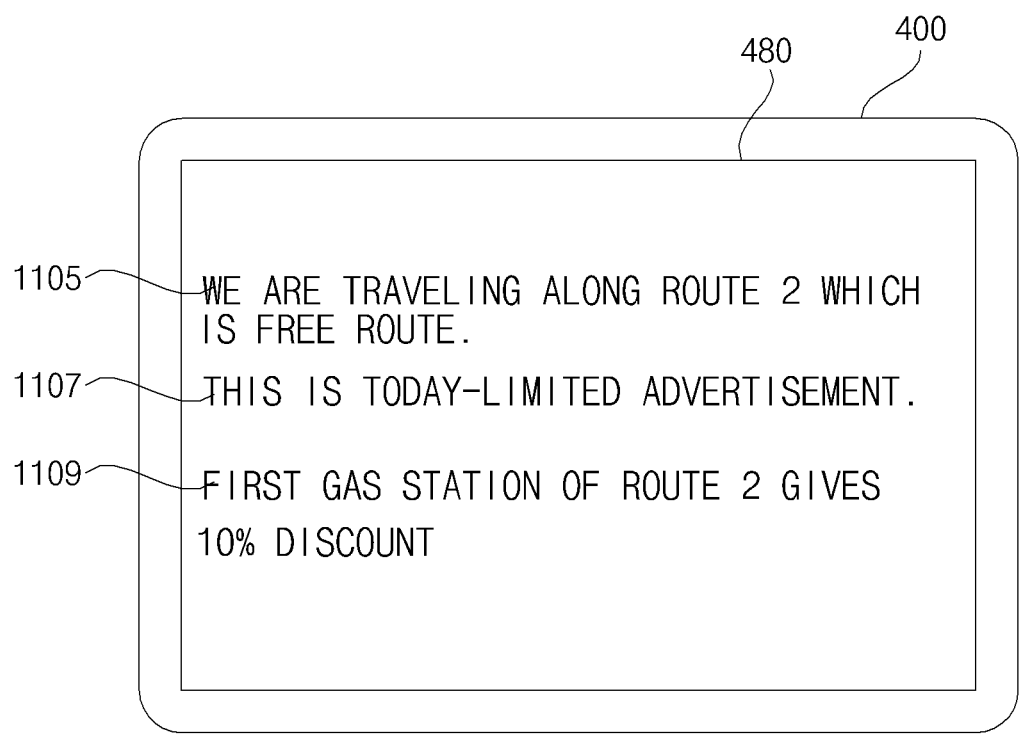

In addition, the processor 170 or 770 may perform control to output advertisement information 1109 located at any point on a specific route as shown in FIG. 11a, regardless of approaching the vicinity of the specific store while the vehicle travels along a specific route.

At this time, the processor 170 or 770 may perform control to display specific route traveling information 1105 as shown in FIG. 11a.

FIG. 11a shows the case where the advertisement information 1109 located at any point of the specific route, specific route traveling information 1105 and today-limited advertisement information 1107 are displayed on the display 480.

The communication unit 730 of the vehicle 200 may receive advertisement information corresponding to a vehicle speed or a road condition from the advertisement provider server 810.

Figure 11B:
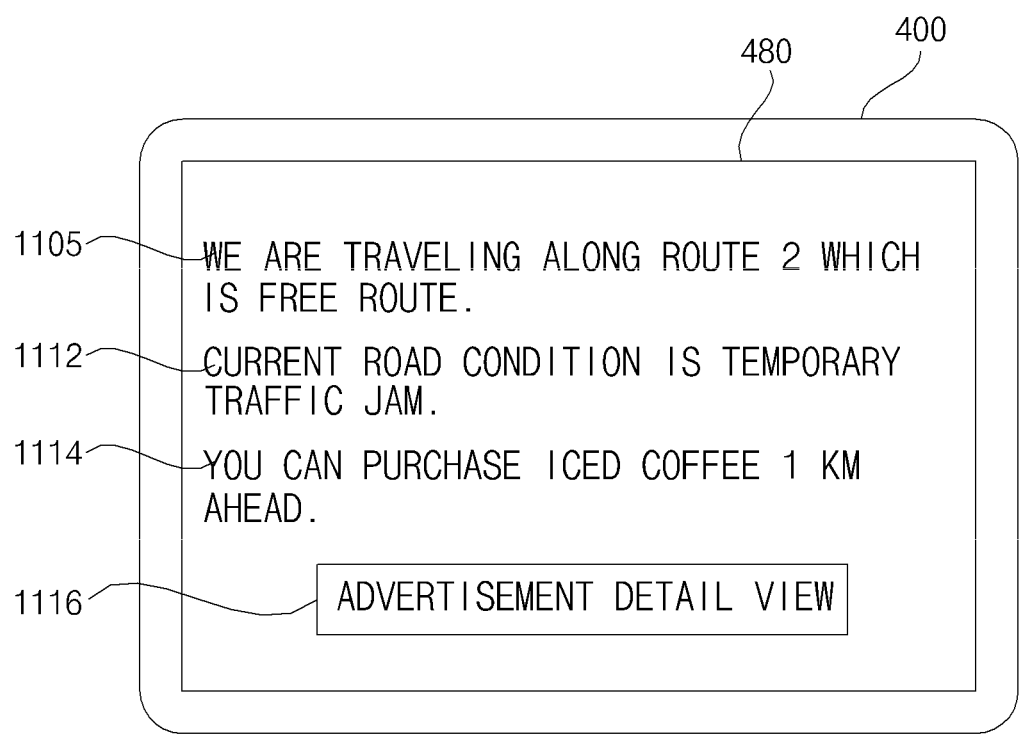

In addition, the processor 170 or 770 may perform control to output vehicle speed or road condition information 1112 and advertisement information 1114 corresponding to the vehicle speed or the road condition, as shown in FIG. 11b.

At this time, the processor 170 or 770 may perform control to also display specific route traveling information 1105 and an advertisement detail view item 1116, as shown in FIG. 11b.

Meanwhile, the communication unit 730 of the vehicle 200 may receive advertisement information corresponding to a current time or current weather from the advertisement provider server 810.

Figure 11C:
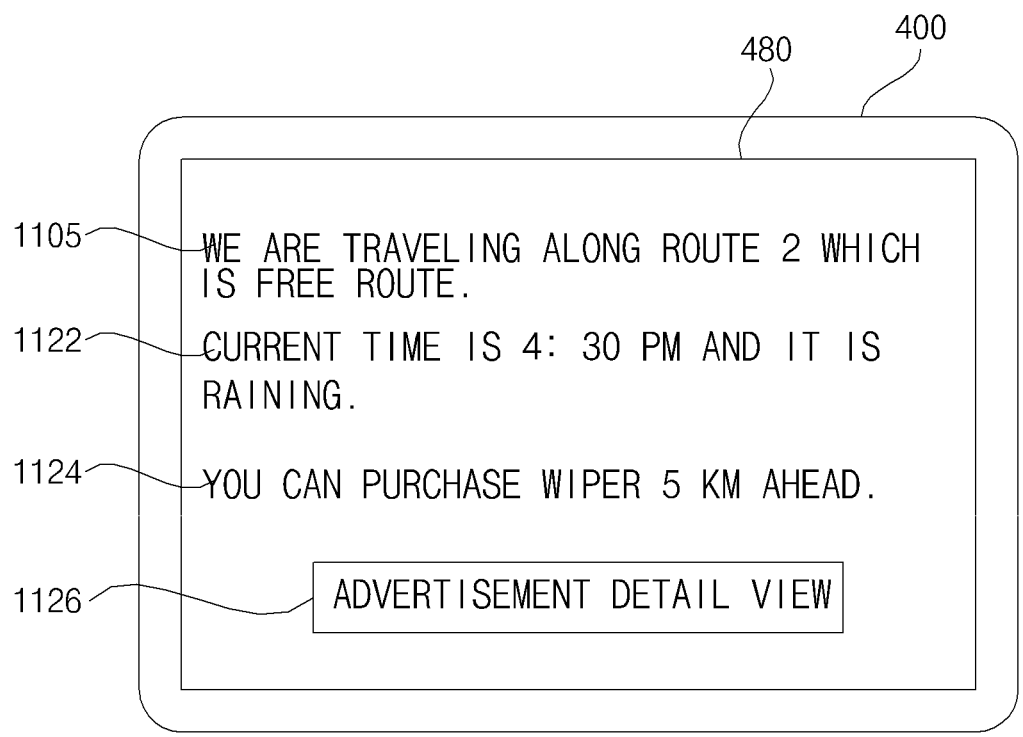

In addition, the processor 170 or 770 may perform control to output current time or current weather information 1122 and advertisement information 1124 corresponding to the current time or current weather, as shown in FIG. 11c.

At this time, the processor 170 or 770 may perform control to also display specific route traveling information 1105 and an advertisement detail view item 1126, as shown in FIG. 11c.

The communication unit 730 of the vehicle 200 may transmit vehicle passenger information such as the number of passengers in the vehicle and the preference of the passengers in the vehicle to the advertisement provider server 810, and receive advertisement information corresponding to the number of passengers in the vehicle from the advertisement provider server 810 in response thereto.

Figure 11D:
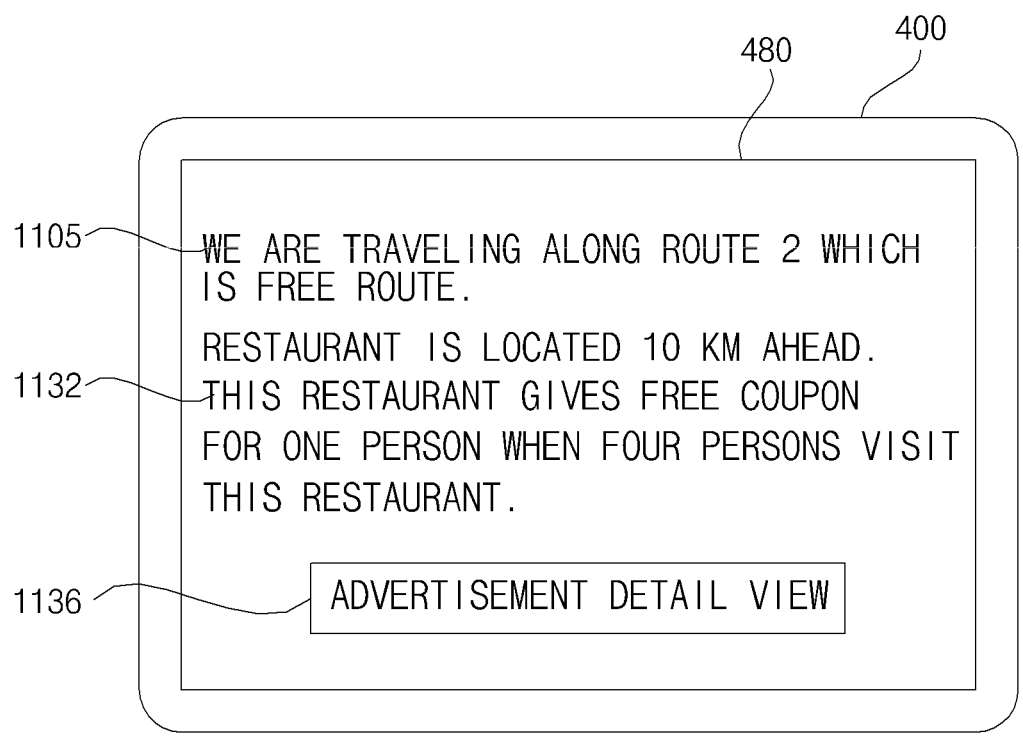

In addition, the processor 170 or 770 may perform control to output advertisement information 1132 corresponding to the vehicle passenger, as shown in FIG. 11*d*.

FIG. 11*d* shows the case where advertisement information 1132 targeted at four vehicle passengers is displayed on the display 480.

At this time, the processor 170 or 770 may perform control to also display specific route traveling information 1105 and an advertisement detail view item 1136, as shown in FIG. 11*d*.

The communication unit 730 of the vehicle 200 may receive advertisement information targeted at any one of the vehicle passengers from the advertisement provider server 810.

Figure 11E:
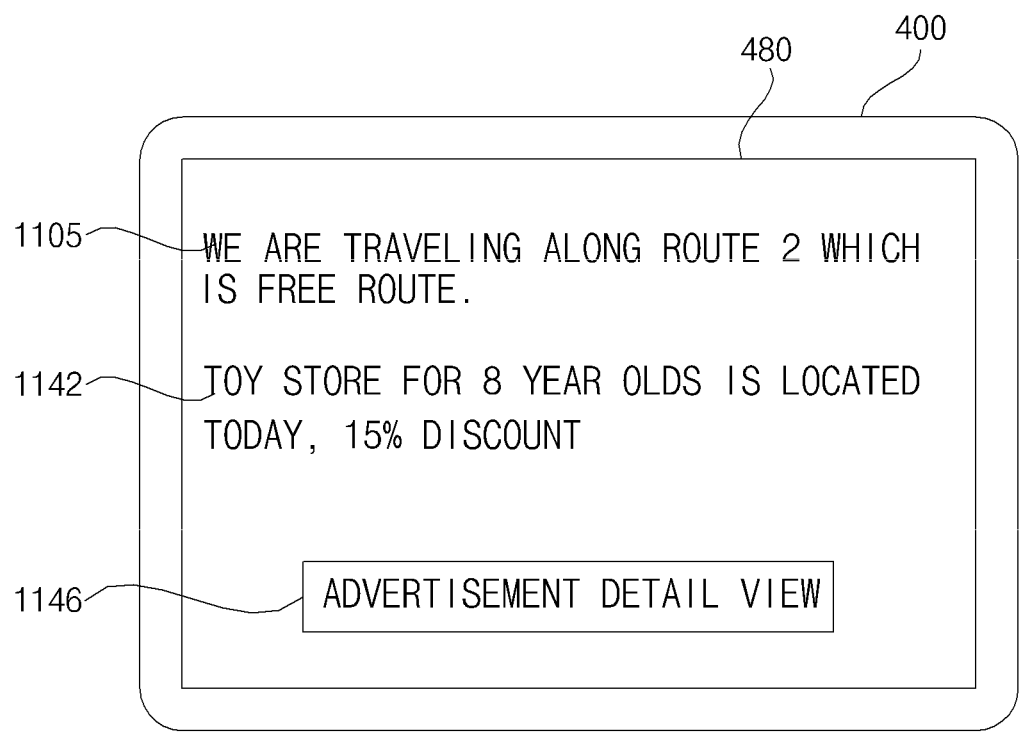

In addition, the processor 170 or 770 may perform control to output advertisement information 1142 targeted at any one of the vehicle passengers, as shown in FIG. 11*e*.

FIG. 11*e* shows the case where advertisement information 1142 targeted at a child among vehicle passengers is displayed on the display 480.

At this time, the processor 170 or 770 may perform control to also display specific route traveling information 1105 and an advertisement detail view item 1146, as shown in FIG. 11*e*.

The processor 170 or 770 may receive advertisement information from the outside while the vehicle travels along a selected route, perform control to display the received advertisement information through at least one of the display or the audio output unit when the vehicle travels at a first point, and perform control to end advertisement output when the vehicle travels at a second point.

Figure 12A:
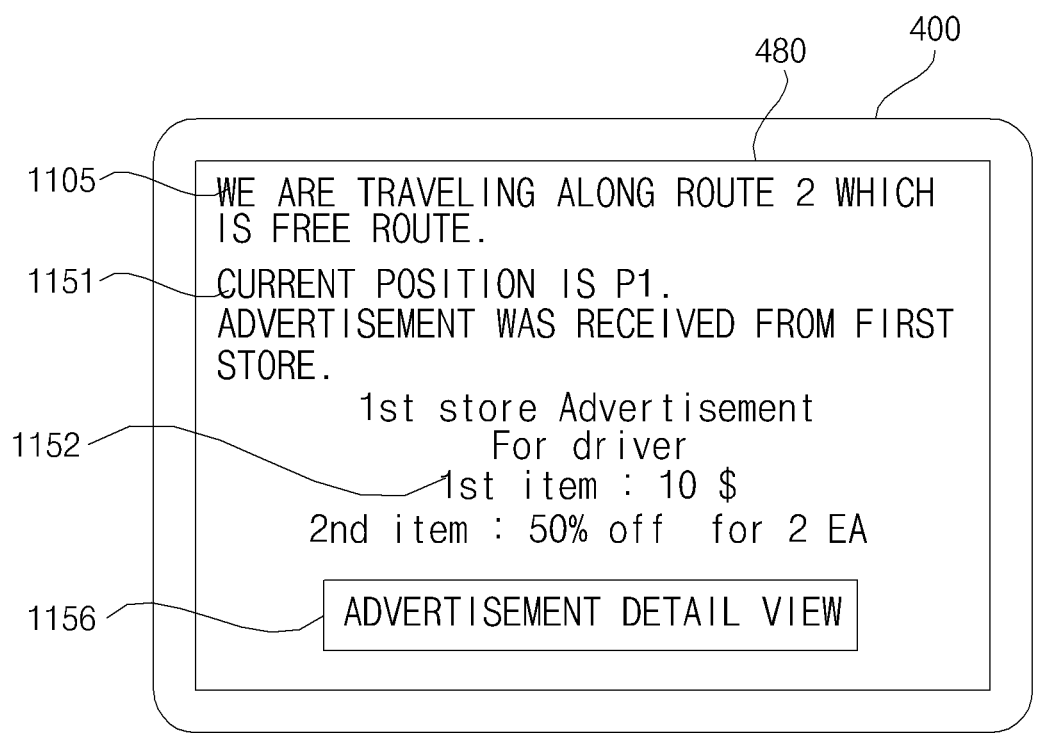

In particular, the processor 170 or 770 may perform control to output current position information 1151 and advertisement information 1152 received from the advertisement provider server 810 or a specific store server according to the current position, as shown in FIG. 12*a*.

At this time, the processor 170 or 770 may perform control to also display specific route traveling information 1105 and an advertisement detail view item 1156, as shown in FIG. 12*a*.

Figure 12B:
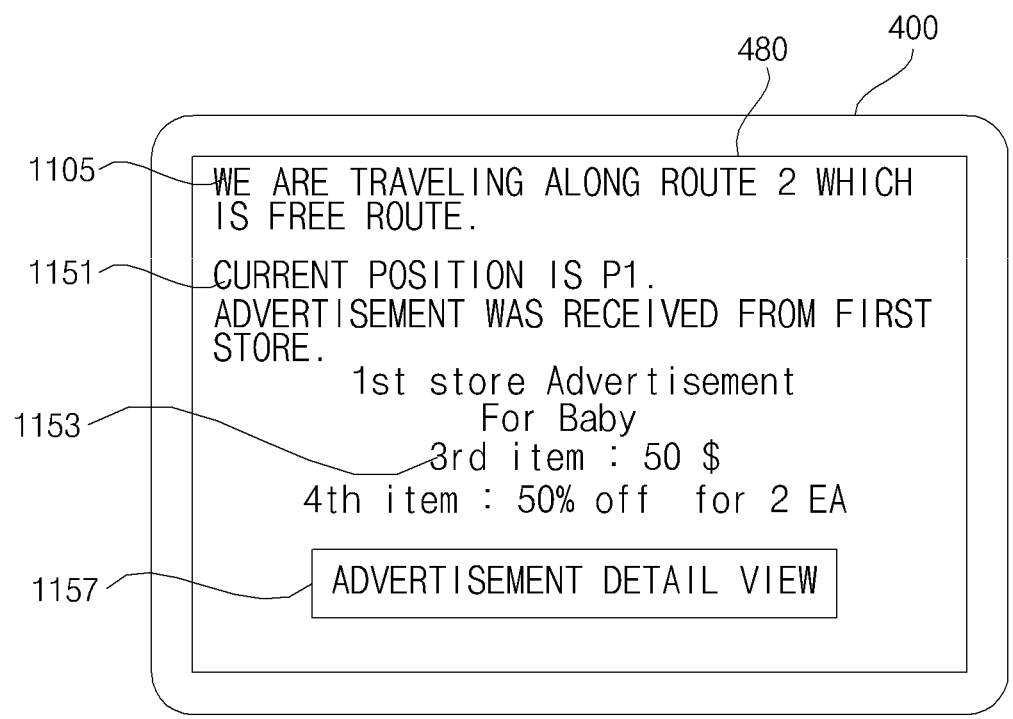

The processor 170 or 770 receive advertisement information from the outside while the vehicle travels along a selected route, perform control to display the advertisement information 1152 targeted at a driver among the received advertisement information as shown in FIG. 12*a* when the vehicle travels at a first point, and perform control to display advertisement information 1153 targeted at a specific passenger (child) as shown in FIG. 12*b* when the vehicle travels at a second point.

For example, when output of advertisement information targeted at the driver is set in advance by selection of the driver, the processor 170 or 770 may perform control to display advertisement information 1152 targeted at the driver as shown in FIG. 12*a* and perform control not to display advertisement information 1153 targeted at the specific passenger (child) shown in FIG. 12*b*.

The processor 170 or 770 may receive advertisement information from the outside while the vehicle travels along a selected route and perform control to sequentially display a plurality of pieces of received advertisement information when the vehicle travels at a first point.

That is, the processor 170 or 770 may perform control to first display the advertisement information 1152 targeted at the driver as shown in FIG. 12*a* and perform control to display advertisement information 1153 targeted at the specific passenger (child) shown in FIG. 12*b* after a predetermined time.

For example, before the vehicle 200 passes by a first store, up to the advertisement information 1153 targeted at the specific passenger (child) may be displayed.

The processor 170 or 770 may perform control to no longer display the advertisement information, which has been displayed, when the vehicle 200 continuously travels.

The processor 170 or 770 may perform control to selectively output some of the received advertisement information based on the driver information of the vehicle, the passenger information or the vehicle information.

The communication unit 730 of the vehicle 200 may receive advertisement information from the advertisement provider server 810 or a second store server, when the vehicle 200 continuously travels to arrive at the vicinity of the second store of FIG. 10.

Figure 12C:
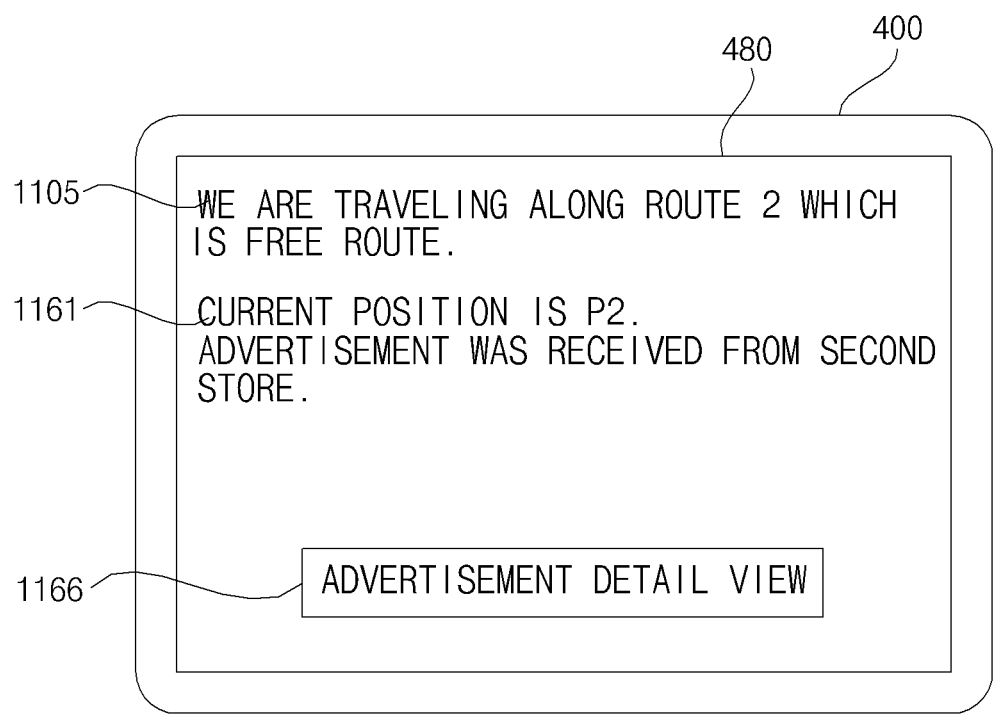

In addition, the processor 170 or 770 may perform control to output reception information 1161 of advertisement information received from the advertisement provider server 810 or the second store server, as shown in FIG. 12*c*.

In addition, the processor 170 or 770 may perform control to output the advertisement information received from the advertisement provider server 810 or the second store server.

Meanwhile, when the vehicle 200 arrives at a destination, the communication unit 730 of the vehicle 200 may transmit advertisement output time information, advertisement viewing time information of the passenger in the vehicle or viewing response information of the passenger in the vehicle upon advertisement output to the advertisement provider server 810.

The processor 170 or 770 may calculate the viewing time information of the passenger or the viewing response information of the passenger based on the image from the internal camera 708 and the driver body information from the driver sensor 799, and perform control to transmit such information to the advertisement provider server 810 or the store server in real time while the vehicle travels.

Alternatively, when the vehicle arrives at the destination, the processor 170 or 770 may perform control to transmit the viewing time information of the passenger, the viewing response information of the passenger, accumulated viewing time information of the passenger and accumulated viewing response information of the passenger of each store to the advertisement provider server 810.

The communication unit 730 may receive parking fee discount information in the vicinity of the destination corresponding to the viewing time information of the passenger or the viewing response information of the passenger.

Figure 12D:
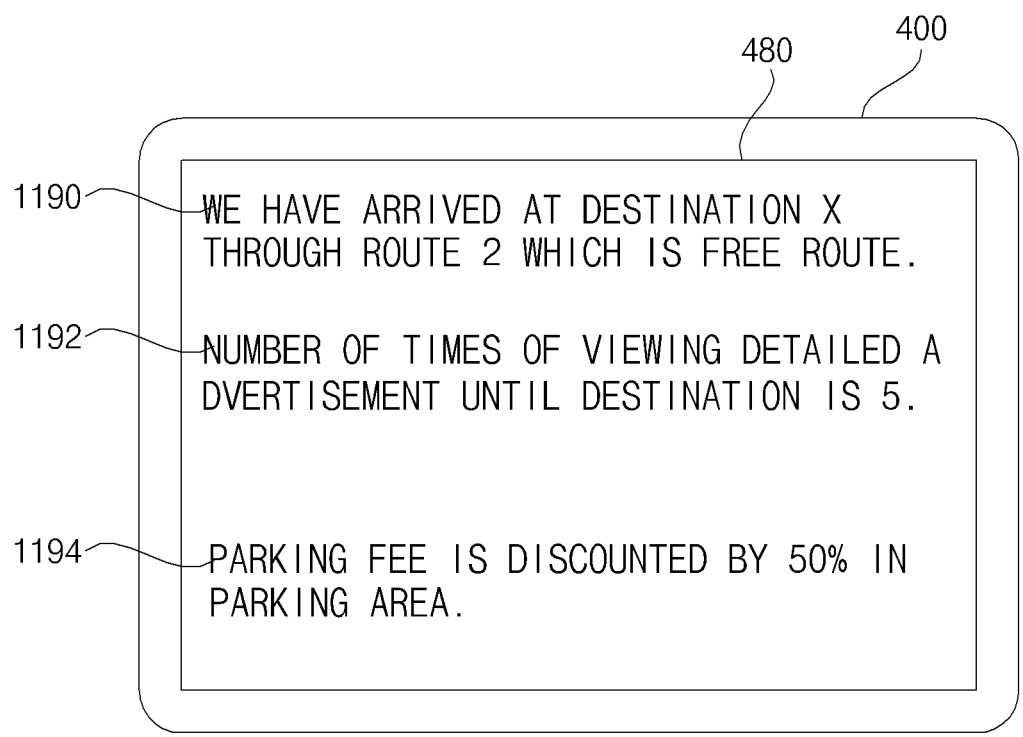

When the vehicle arrives at the destination, the processor 170 or 770 may perform control to display destination arrival information 1190, accumulated viewing time information 1192 of the passenger and parking fee discount information 1194 of the vicinity of the destination, as shown in FIG. 12*d*.

FIGS. 13*a* to 14*h* show user interfaces displayable on the display 180 when a vehicle travels along Route 3 of FIG. 10.

Figure 13A:
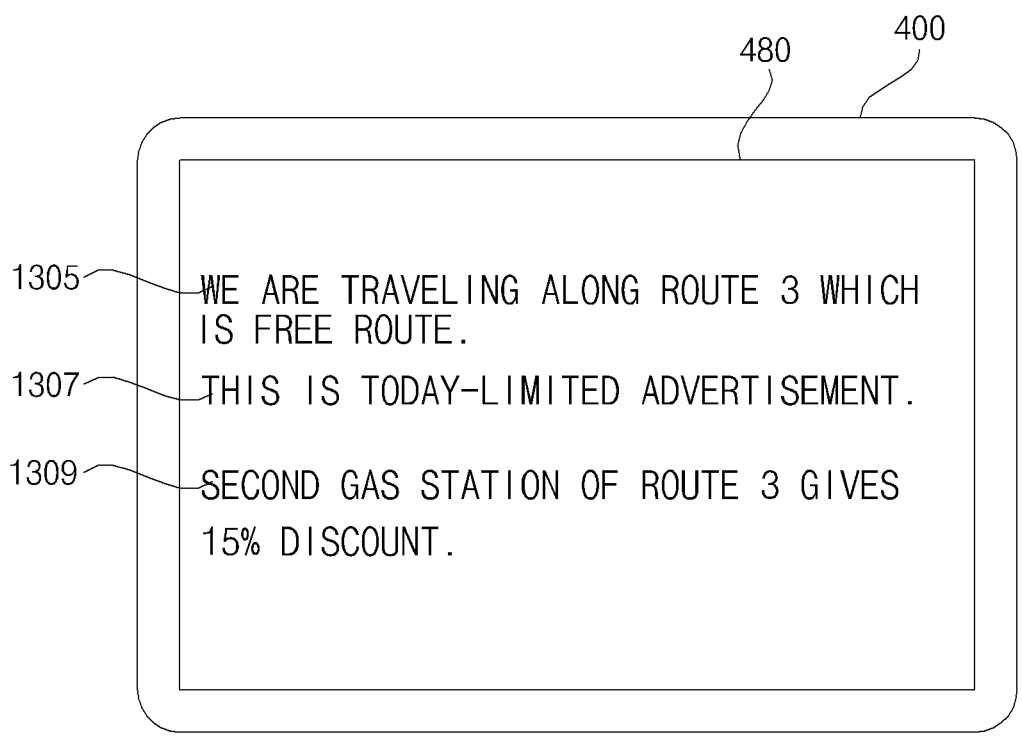

FIG. 13*a* shows the case where the advertisement information 1309 located at any point on the specific route, specific route traveling information 1305 and today-limited advertisement information 1307 are displayed on the display 480.

Figure 13B:
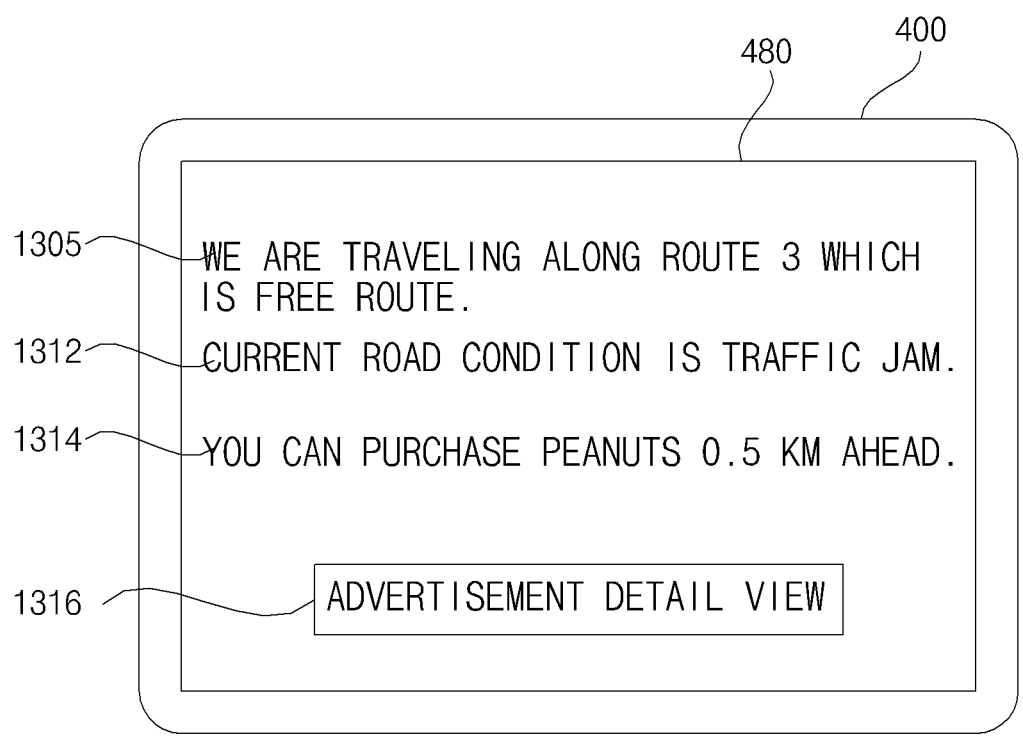

FIG. 13*b* shows the case where vehicle speed or road condition information 1312, advertisement information 1314 corresponding to vehicle speed or road conditions, specific route traveling information 1305 and an advertisement detail view item 1316 are displayed on the display 480.

Figure 13C:
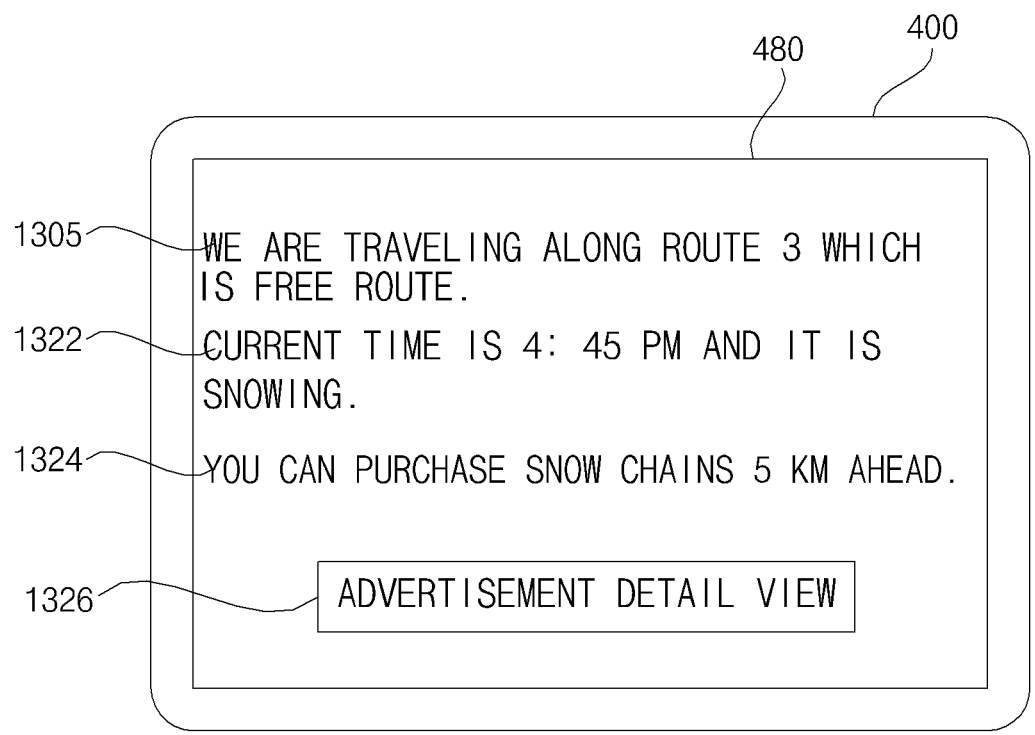

FIG. 13*c* shows the case where current time or current information 1322, advertisement information 1324 corresponding to a current time or current weather, specific route traveling information 1305 and an advertisement detail view item 1326 are displayed on the display 480.

Figure 13D:
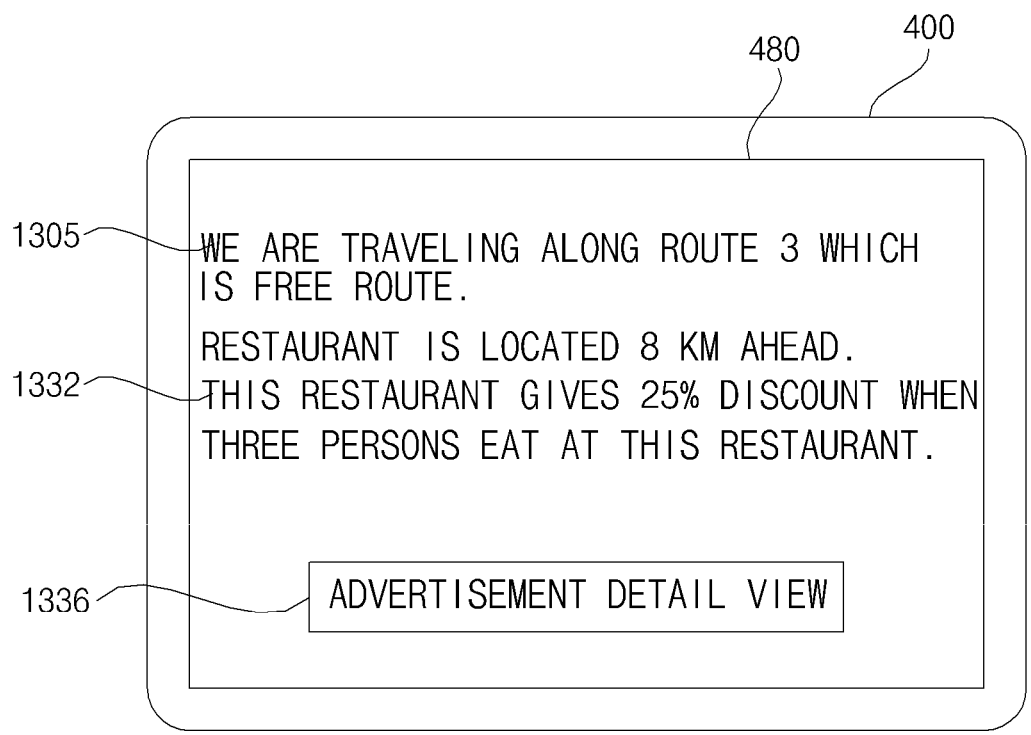

FIG. 13*d* shows the case where advertisement information 1332 targeted at three vehicle passengers, specific route traveling information 1305 and an advertisement detail view item 1336 are displayed on the display 480.

Figure 13E:
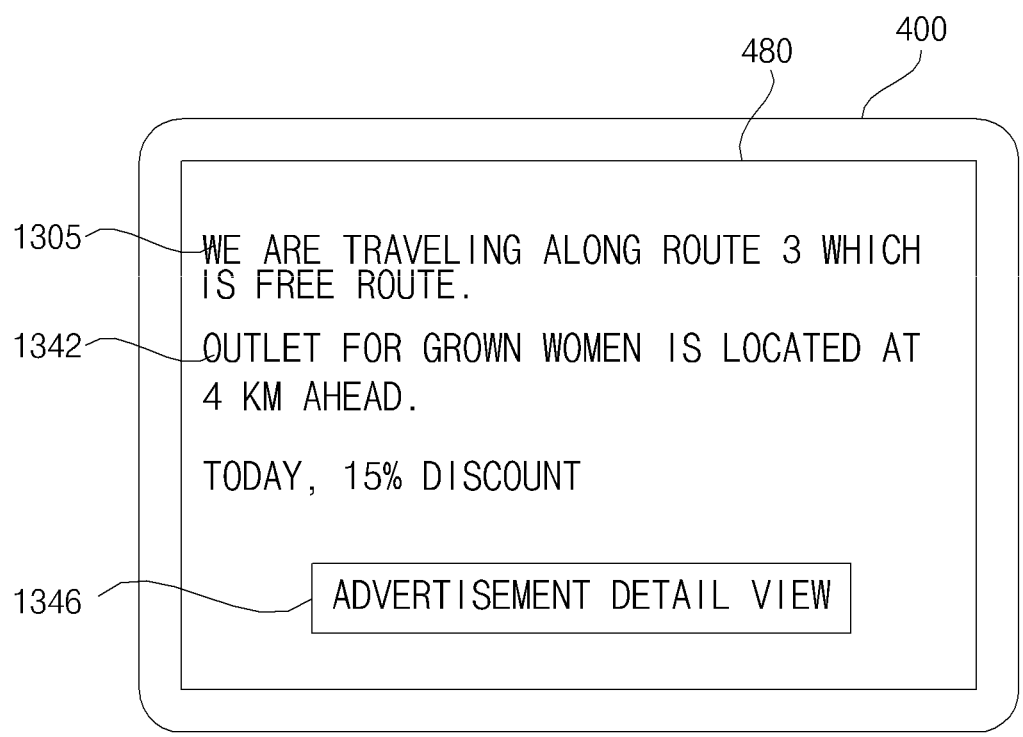

FIG. 13*e* shows the case where advertisement information 1342 targeted at a grown woman among vehicle passengers, specific route traveling information 1305 and an advertisement detail view item 1346 are displayed on the display 480.

Figure 14A:
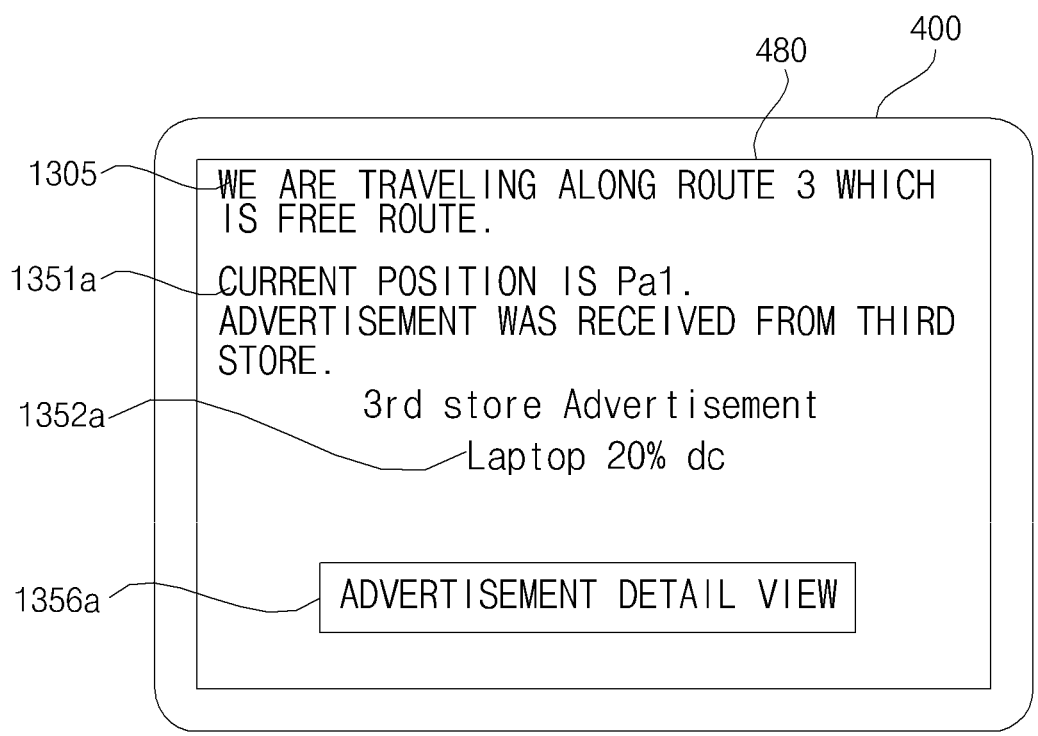
Figure 14B:
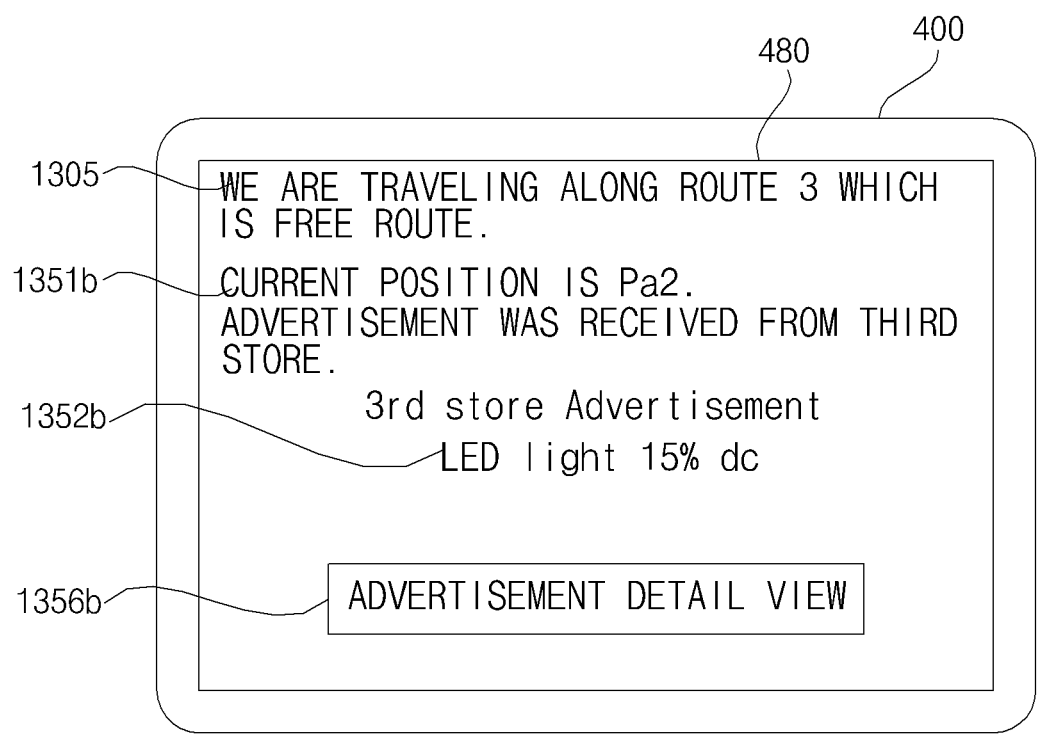
Figure 14C:
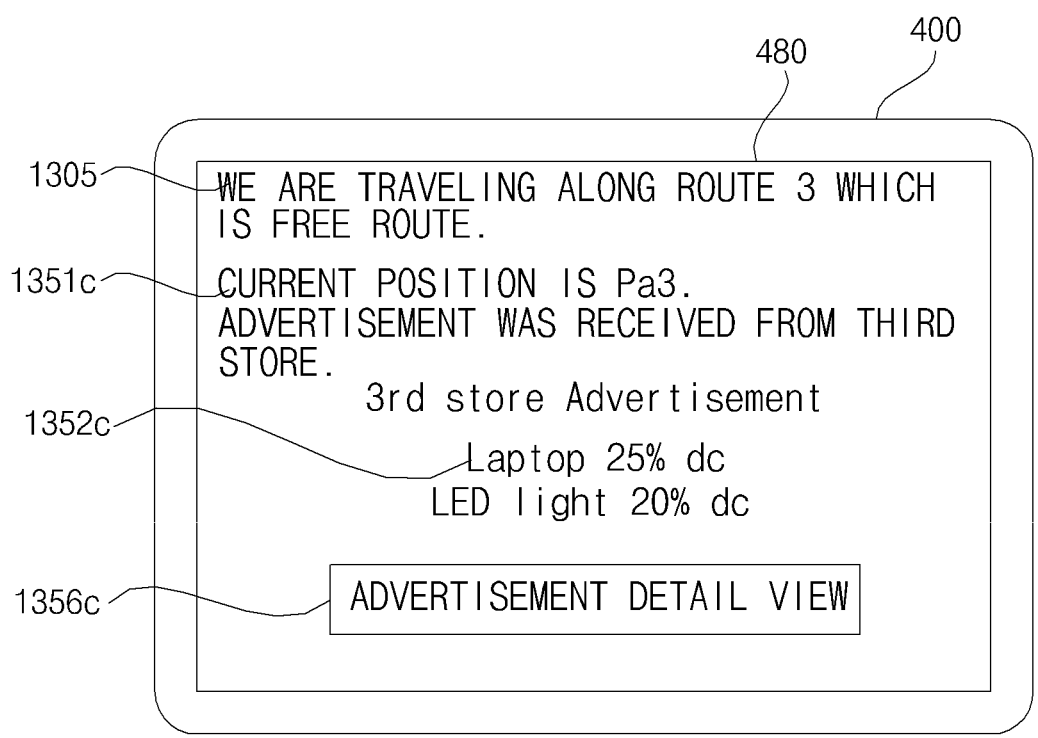

FIGS. 14*a* to 14*c* show the case where advertisement information 1352*a*, 1352*b* and 1352*c* of the same store, Pa1, Pa2, P3 point information 1351*a*, 1351*b* and 1351*c*, specific route traveling information 1305 and advertisement detail view items 1356*a*, 1356*b* and 1356*c* are displayed on the display 480.

The advertisement information 1352*c* related to the store among advertisement information 1352*a*, 1352*b* and 1352*c* of the same store may be advertisement information having a higher product discount rate. That is, as the vehicle 200 passes by the third store, advertisement information having a higher product discount rate may be displayed.

Figure 14D:
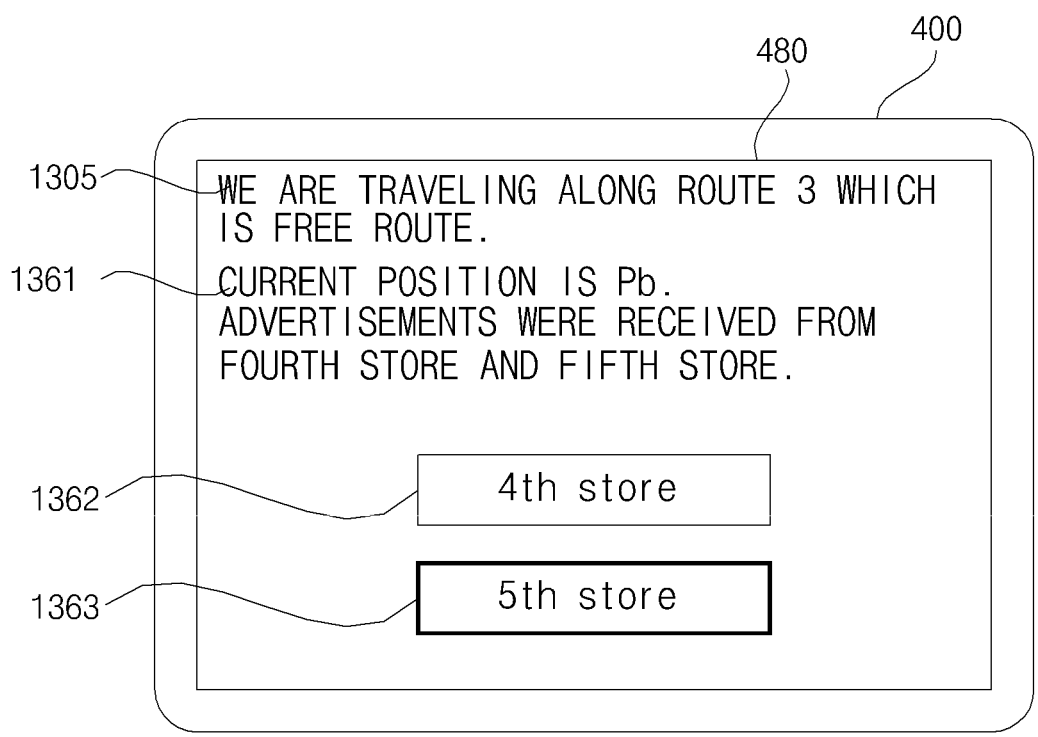

The processor 170 or 770 of the vehicle 200 may perform control to display store selection items 162 and 1463 as shown in FIG. 14*d* when advertisement information of different stores is received simultaneously or consecutively within a predetermined time.

FIG. 14*d* shows the case where store selection items 162 and 1463, specific route traveling information 1305 and advertisement reception end information 1361 from a plurality of stores are displayed on the display 480.

Figure 14E:
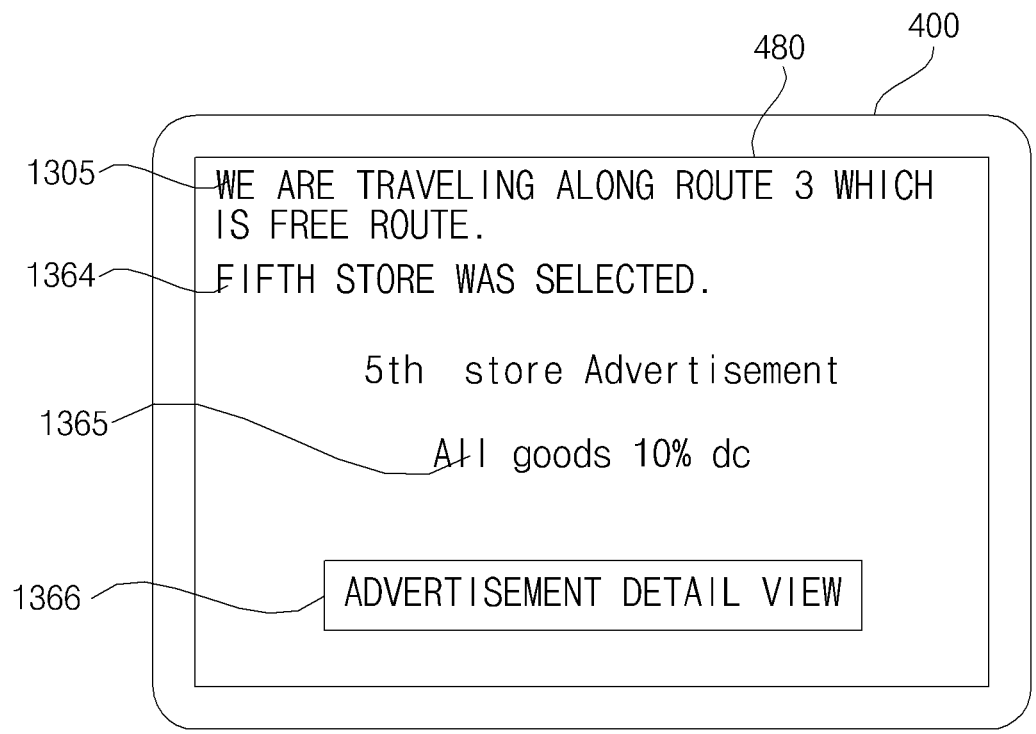

When a fifth store item 1363 is selected, the processor 170 or 770 of the vehicle 200 may perform control to display fifth store selection information 1364, fifth store advertisement information 1365, and an advertisement detail view item 1366 on the display 480 as shown in FIG. 14*e*.

Figure 14F:
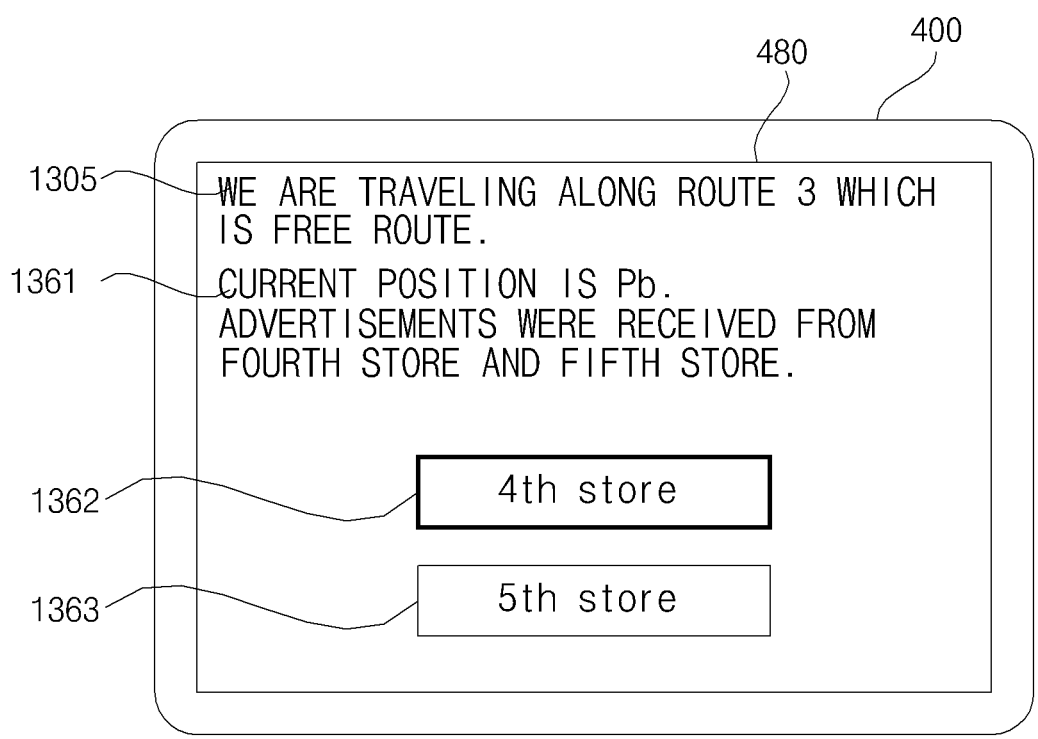
Figure 14G:
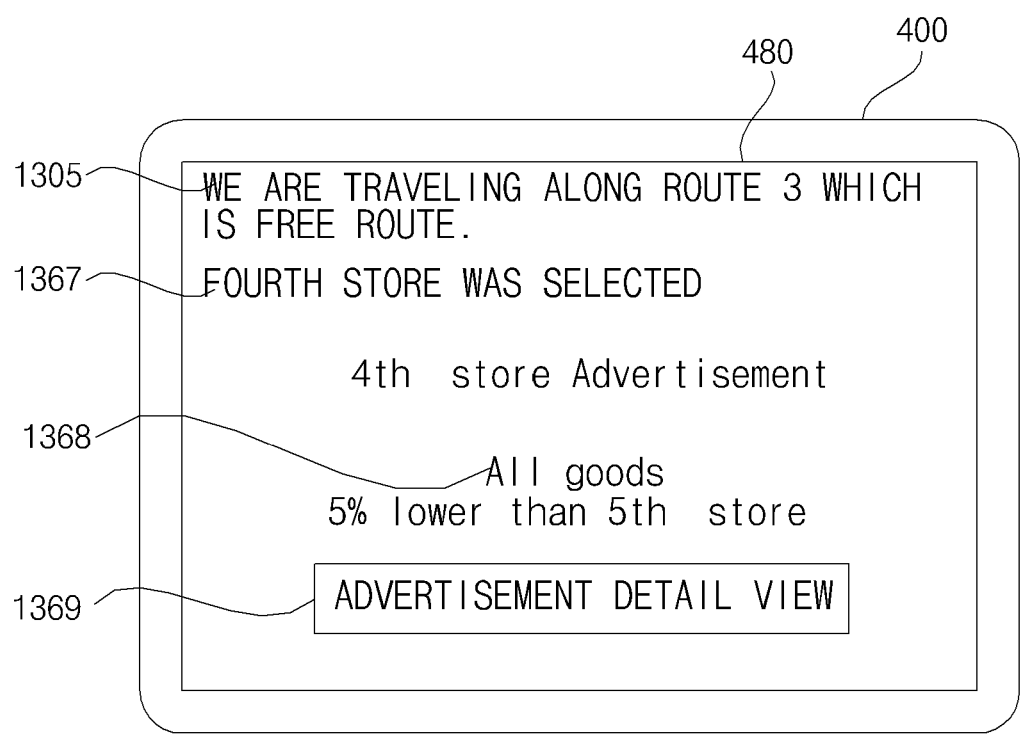

As shown in FIG. 14*f*, when a fourth store item 1362 is selected, the processor 170 or 770 of the vehicle 200 may perform control to display fourth store selection information 1367, fourth store advertisement information 1368, and an advertisement detail view item 1369 on the display 480 as shown in FIG. 14*g*.

Figure 14H:
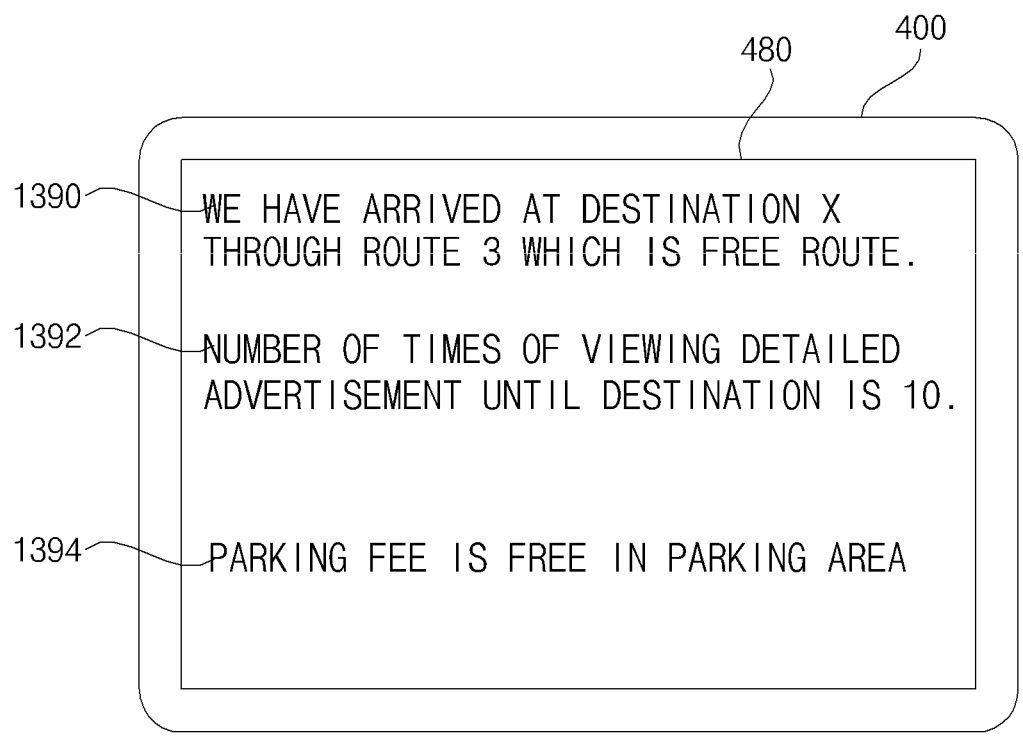

When the vehicle arrives at a destination, the processor 170 or 770 may perform control to display destination arrival information 1390, accumulated viewing time information 1392 of the passenger and parking fee discount information 1394 in the vicinity of the destination, as shown in FIG. 14*h*.

The processor 170 or 770 may perform control to output information indicating whether to move to a position related to the advertisement information after outputting the advertisement information through at least one of the display or the audio output unit.

In addition, upon determining that the vehicle moves to the position related to advertisement information according to input of the driver or the passenger, the processor 170 or 770 may control the vehicle 200 to move to the position related to the advertisement information.

Specifically, the processor 170 or 770 may control at least one of the steering drive unit, the brake drive unit or the power supply drive unit when the vehicle autonomously travels, based on the images from the plurality of cameras 195 or 295 and the distance information of the object located near the vehicle, which is received from the radar.

According to another embodiment of the present invention, when any one of a plurality of pieces of advertisement information received through the communication unit 730 is selected in the autonomous mode, the processor 170 or 770 of the vehicle 200 may select any one of a plurality of routes to a destination based on the selected advertisement information and control the vehicle to autonomously travel along the selected route.

That is, as described above, after advertisement information is selected, a route to a destination may be determined based on the selected advertisement information.

The method of operating the autonomous vehicle of the present invention may be implemented as code that can be read by a processor on a recording medium readable by a processor provided in an autonomous apparatus or a vehicle. The processor-readable recording medium may be any type of recording device in which data can be stored in a processor-readable manner. Examples of the processor-readable recording medium include a ROM, a RAM, a CD-ROM, a magnetic tape, a floppy disk, optical data storage, and a carrier wave (e.g., data transmission over the Internet). The processor-readable recording medium may be distributed over a plurality of computer systems connected to a network so that processor-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

The invention claimed is:

1. An autonomous vehicle comprising:
a plurality of cameras;
a radar;
a communication unit;
a display;
an audio output unit; and
a processor configured to select any one of a plurality of routes to a destination in an autonomous mode, to control the vehicle to autonomously travel along the selected route, to receive advertisement information from the outside while the vehicle travels along the selected route, and to perform control to output the received advertisement information through at least one of the display or the audio output unit,
wherein the received advertisement information is changed according to the plurality of routes, and
wherein, when the advertisement information of different stores is received simultaneously or consecutively within a predetermined time, the processor performs control to output advertisement information having highest priority among a plurality of store advertisements through at least one of the display or the audio output unit according to driver preference, passenger preference, or discount rates of the stores.

2. The autonomous vehicle according to claim 1, wherein the processor performs control to selectively output some of the received advertisement information based on driver information of the vehicle, passenger information or vehicle information.

3. The autonomous vehicle according to claim 1, wherein the processor performs control to transmit, to the outside, advertisement output time information, advertisement viewing time information of a passenger in the vehicle or viewing response information of the passenger in the vehicle upon advertisement output.

4. The autonomous vehicle according to claim 1, wherein cost required to travel to the destination or a parking fee after arriving at the destination or service related to advertisement or goods price provided by a service provider is changed according to advertisement output time information, advertisement viewing time information of the passenger or viewing response information of the passenger.

5. The autonomous vehicle according to claim 1, wherein the processor selects the destination and any one of a plurality of routes according to input of a driver or a passenger.

6. The autonomous vehicle according to claim 1,
wherein the processor sets the destination according to input of a driver or a passenger, and
wherein any one of a plurality of routes is selected according to information on the driver or the passenger.

7. The autonomous vehicle according to claim 1, wherein the processor performs control to output information indicating whether to move to a position related to the advertisement information through at least one of the display or the audio output unit after outputting the advertisement information.

8. The autonomous vehicle according to claim 1, wherein the received advertisement information is changed according to a vehicle speed or a road condition.

9. The autonomous vehicle according to claim 1, wherein the processor changes the advertisement information output through at least one of the display or the audio output unit among the received information, according to a vehicle speed or a road condition.

10. The autonomous vehicle according to claim 1, wherein the processor receives advertisement information from the outside when the vehicle travels along the selected route, performs control to output the received advertisement information through at least one of the display or the audio output unit when the vehicle travels at a first point, and performs control to end advertisement output when the vehicle travels at a second point.

11. The autonomous vehicle according to claim 1, wherein the advertisement information is received from an adjacent vehicle or a transmission apparatus of a store located near a road on which the vehicle travels.

12. The autonomous vehicle according to claim 1, further comprising an audio input unit,
wherein, when driver voice is received through the audio input unit, the processor recognizes the driver voice and extracts destination information based on the recognized driver voice.

13. The autonomous vehicle according to claim 1,
wherein the communication unit receives schedule information of a driver from a mobile terminal of the driver, and
wherein the processor extracts destination information based on the schedule information.

14. The autonomous vehicle according to claim 1,
wherein the communication unit receives route state information of a route along which the vehicle travels, and
wherein, when information indicating that a vehicle accident occurs ahead is received as the received route state information or when a difference between an estimated time of arrival and a target time is equal to or greater than a predetermined value, the processor searches for a detour route based on at least one of a road type, a speed limit, a current speed, curvature of a road, a crossroads, traffic and presence/absence of a construction zone, selects any one of searched detour routes, changes the route, and controls the vehicle to autonomously travel along the changed route.

15. The autonomous vehicle according to claim 1, further comprising:
a steering drive unit to drive a steering apparatus;
a brake drive unit to drive a brake apparatus; and
a power supply drive unit to drive a power supply,
wherein the processor controls at least one of the steering drive unit, the brake drive unit or the power supply drive unit when the vehicle autonomously travels, based on images from the plurality of cameras and distance information of an object located near the vehicle, which is received from the radar.

16. An autonomous vehicle comprising:
an internal camera;
a driver sensor to sense body information of a driver;
a plurality of cameras;
a radar;
a communication unit;
a display;
an audio output unit; and
a processor configured to select any one of a plurality of routes to a destination in an autonomous mode, to control the vehicle to autonomously travel along the selected route, to receive advertisement information from the outside while the vehicle travels along the selected route, and to perform control to output the received advertisement information through at least one of the display or the audio output unit,
wherein the received advertisement information is changed according to the plurality of routes,
wherein the processor performs control to transmit, to the outside, advertisement output time information, advertisement viewing time information of a passenger in the vehicle or viewing response information of the passenger in the vehicle upon advertisement output, and
wherein the processor calculates the advertisement viewing time information of the passenger or the viewing response information of the passenger based on an image from the internal camera and the body information of the driver from the driver sensor.

17. An autonomous vehicle comprising:
a plurality of cameras;
a radar;
a communication unit;
a display;
an audio output unit; and
a processor configured to select any one of a plurality of routes to destination when any one of a plurality of pieces of advertisement information received through the communication unit is selected in an autonomous mode and to control the vehicle to autonomously travel along the selected route,
wherein, when the advertisement information of different stores is received simultaneously or consecutively within a predetermined time, the processor performs control to output advertisement information having highest priority among a plurality of store advertisements through at least one of the display or the audio output unit according to driver preference, passenger preference, or discount rates of the stores.

18. An autonomous vehicle system comprising:

a vehicle comprising a processor configured to select any one of a plurality of routes to a destination in an autonomous mode, to control the vehicle to autonomously travel along the selected route, to receive advertisement information from the outside while the vehicle travels along the selected route, and to perform control to output the received advertisement information through at least one of a display or an audio output unit;

an advertisement provider server to transmit the advertisement information to the vehicle; and a service provider server to receive cost information from the advertisement provider server and to provide a service corresponding to the cost information to the vehicle or a terminal of a driver of the vehicle, and wherein, when the advertisement information of different stores is received simultaneously or consecutively within a predetermined time, the processor performs control to output advertisement information having highest priority among a plurality of store advertisements through at least one of the display or the audio output unit according to driver preference, passenger preference, or discount rates of the stores.

19. The autonomous vehicle system according to claim 18, further comprising an advertiser terminal to receive advertisement output time information, viewing time information of a passenger or viewing response information of the passenger from a terminal of a passenger or the vehicle and to provide promotion information corresponding to the received information to the terminal of the passenger or the vehicle.

* * * * *